(12) United States Patent
Wan et al.

(10) Patent No.: US 12,526,351 B2
(45) Date of Patent: Jan. 13, 2026

(54) PCIe-BASED DATA TRANSMISSION METHOD AND APPARATUS

(71) Applicant: SHENZHEN YINWANG INTELLIGENT TECHNOLOGIES CO., LTD., Shenzhen (CN)

(72) Inventors: Lei Wan, Beijing (CN); Pengxin Bao, Chengdu (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 444 days.

(21) Appl. No.: 17/870,494

(22) Filed: Jul. 21, 2022

(65) Prior Publication Data
US 2022/0368781 A1    Nov. 17, 2022

Related U.S. Application Data

(63) Continuation of application No. PCT/CN2020/073926, filed on Jan. 22, 2020.

(51) Int. Cl.
*H04L 69/22* (2022.01)
*G06F 13/42* (2006.01)
*H04L 45/745* (2022.01)

(52) U.S. Cl.
CPC .......... *H04L 69/22* (2013.01); *G06F 13/4221* (2013.01); *H04L 45/745* (2013.01); *G06F 2213/0026* (2013.01); *H04L 2212/00* (2013.01)

(58) Field of Classification Search
None
See application file for complete search history.

(56) References Cited

U.S. PATENT DOCUMENTS

| | | |
|---|---|---|
| 5,473,691 A | 12/1995 | Menezes et al. |
| 7,013,354 B1 | 3/2006 | Beck et al. |
| 8,139,575 B2 | 3/2012 | Biran et al. |

(Continued)

FOREIGN PATENT DOCUMENTS

| | | |
|---|---|---|
| CN | 1608255 A | 4/2005 |
| CN | 1608256 A | 4/2005 |

(Continued)

OTHER PUBLICATIONS

Wagh Mahesh: "PCIe 3.0/2.1 Protocol Update", Dec. 31, 2011 (Dec. 31, 2011), pp. 1-35, XP055980142, Total 35 Pages.

(Continued)

*Primary Examiner* — Adnan Baig
(74) *Attorney, Agent, or Firm* — Conley Rose, P.C.

(57) ABSTRACT

A Peripheral Component Interconnect Express (PCIe)-based data transmission method and apparatus includes a first node that encapsulates data into a transaction layer packet (TLP) and then sends the TLP to a second node, where the TLP includes a packet header part, a first field and a second field of the packet header part that are used to indicate first encapsulation information, and the first encapsulation information includes a data type of the data and at least one encapsulation parameter corresponding to the data type. The first field and the second field are used to indicate the information required for transmitting the data, so that the endpoints can communicate with each other even if the root is not used.

20 Claims, 17 Drawing Sheets

(56) References Cited

U.S. PATENT DOCUMENTS

| | | | |
|---|---|---|---|
| 9,280,290 B2 | 3/2016 | Feehrer et al. | |
| 10,176,126 B1 | 1/2019 | Banerjee et al. | |
| 10,423,552 B2 | 9/2019 | Harriman | |
| 2003/0123484 A1 | 7/2003 | Harriman | |
| 2003/0126281 A1 | 7/2003 | Harriman | |
| 2003/0174716 A1* | 9/2003 | Lee | G06F 13/4282 370/473 |
| 2005/0238038 A1 | 10/2005 | Keller et al. | |
| 2006/0153078 A1 | 7/2006 | Yasui | |
| 2006/0153226 A1 | 7/2006 | Gostin et al. | |
| 2006/0161707 A1 | 7/2006 | Davies et al. | |
| 2007/0130397 A1 | 6/2007 | Tsu | |
| 2007/0147426 A1 | 6/2007 | Sharma et al. | |
| 2007/0168644 A1 | 7/2007 | Hummel et al. | |
| 2007/0198763 A1* | 8/2007 | Suzuki | G06F 13/4022 710/316 |
| 2008/0016269 A1 | 1/2008 | Chow et al. | |
| 2009/0006932 A1 | 1/2009 | Biran et al. | |
| 2009/0296740 A1 | 12/2009 | Wagh et al. | |
| 2012/0017025 A1 | 1/2012 | Luk et al. | |
| 2013/0003540 A1* | 1/2013 | Teoh | H04L 12/12 370/230 |
| 2013/0111086 A1 | 5/2013 | Ajanovic et al. | |
| 2014/0122769 A1 | 5/2014 | Su et al. | |
| 2014/0181354 A1 | 6/2014 | Yi et al. | |
| 2014/0281104 A1 | 9/2014 | Raskin | |
| 2014/0372660 A1 | 12/2014 | Jones et al. | |
| 2015/0207712 A1 | 7/2015 | Fang et al. | |
| 2015/0227312 A1 | 8/2015 | Feehrer et al. | |
| 2016/0041936 A1 | 2/2016 | Lee et al. | |
| 2016/0188517 A1 | 6/2016 | Naven et al. | |
| 2016/0371221 A1 | 12/2016 | Rosenberg et al. | |
| 2017/0060422 A1* | 3/2017 | Sharifie | G06F 3/0659 |
| 2017/0068636 A1 | 3/2017 | Vishwanathan et al. | |
| 2017/0220494 A1 | 8/2017 | Shacham et al. | |
| 2018/0095817 A1 | 4/2018 | Zhang et al. | |
| 2018/0101498 A1 | 4/2018 | Cosby et al. | |
| 2018/0307648 A1 | 10/2018 | Shakamuri et al. | |
| 2018/0341619 A1 | 11/2018 | Slik | |
| 2019/0108156 A1 | 4/2019 | Lee et al. | |
| 2019/0132198 A1 | 5/2019 | Li et al. | |
| 2019/0278477 A1 | 9/2019 | Benisty | |
| 2019/0286604 A1* | 9/2019 | Minato | G06F 3/0679 |
| 2019/0324930 A1 | 10/2019 | Liu et al. | |
| 2019/0391936 A1* | 12/2019 | Stalley | H04L 67/568 |
| 2020/0012555 A1 | 1/2020 | Das Sharma | |
| 2020/0021540 A1 | 1/2020 | Marolia et al. | |
| 2020/0044895 A1 | 2/2020 | Mittal et al. | |
| 2020/0089645 A1* | 3/2020 | Benjamini | H04L 9/0861 |
| 2020/0133634 A1 | 4/2020 | Ukai | |
| 2020/0226091 A1 | 7/2020 | Harriman | |
| 2021/0026559 A1 | 1/2021 | Richter et al. | |
| 2021/0042255 A1 | 2/2021 | Colenbrander | |
| 2022/0206969 A1 | 6/2022 | Que et al. | |
| 2022/0358070 A1 | 11/2022 | Wan et al. | |
| 2022/0358074 A1 | 11/2022 | Wan et al. | |
| 2022/0358075 A1 | 11/2022 | Wan et al. | |
| 2022/0365895 A1 | 11/2022 | Wan et al. | |
| 2022/0368781 A1 | 11/2022 | Wan et al. | |
| 2022/0374385 A1 | 11/2022 | Wan et al. | |

FOREIGN PATENT DOCUMENTS

| | | |
|---|---|---|
| CN | 1953461 A | 4/2007 |
| CN | 101594306 A | 12/2009 |
| CN | 101681325 A | 3/2010 |
| CN | 102821082 A | 12/2012 |
| CN | 103003808 A | 3/2013 |
| CN | 103023824 A | 4/2013 |
| CN | 103117929 A | 5/2013 |
| CN | 103490852 A | 1/2014 |
| CN | 103532807 A | 1/2014 |
| CN | 103701680 A | 4/2014 |
| CN | 105185414 A | 12/2015 |
| CN | 105205021 A | 12/2015 |
| CN | 105335227 A | 2/2016 |
| CN | 105653481 A | 6/2016 |
| CN | 107656884 A | 2/2018 |
| CN | 107771325 A | 3/2018 |
| CN | 110389711 A | 10/2019 |
| CN | 113498600 A | 10/2021 |
| EP | 3489836 A1 | 5/2019 |
| EP | 3311295 B1 | 12/2019 |
| WO | 2015016882 A1 | 2/2015 |

OTHER PUBLICATIONS

PCI Express Base Specification Revision 5.0; Version 1.0; May 22, 2019, Total 1299 Pages.

Jason Lawley, "Understanding Performance of PCI Express Systems", White Paper: UltraScale and Virtex-7 FPGAs, WP350 (v1.2) Oct. 28, 2014, total 16 pages.

Qiu Xuehong et al.,"Microcomputer Principles and Interface Technology (Third Edition)", Xidian University Press, ISBN978-7-5606-3834-8, Jun. 2016, with an English abstract, total 10 pages.

Shi Dong et al., "Design of High Speed Image Transmission System Based on Double DMA Buffer", Chinese Journal of Electron Devices, vol. 41, No. 6, Dec. 2018, with an English machine translation, total 12 pages.

* cited by examiner

PCIe-BASED DATA TRANSMISSION METHOD AND APPARATUS

CROSS-REFERENCE TO RELATED APPLICATIONS

This is a continuation of International Patent Application No. PCT/CN2020/073926 filed on Jan. 22, 2020, which is hereby incorporated by reference in its entirety.

TECHNICAL FIELD

This disclosure relates to the field of communication technologies, and in particular, to a Peripheral Component Interconnect Express (PCIe)-based data transmission method and apparatus.

BACKGROUND

PCIe is a high-speed short-distance communications interface widely applied to devices such as computers and test instruments. Main components in a PCIe system include a root, a switch, and an endpoint. The root is responsible for managing all buses and nodes in the PCIe system, and is a bridge for communication between a central processing unit (CPU) and the endpoint in the PCIe system. The switch is used as a data forwarding node, and is connected to the switch and the endpoint. The endpoint is an end device, for example, a peripheral. The endpoints in the PCIe system need to communicate with each other through the root.

A mechanism in which the endpoints in the PCIe system need to communicate with each other through the root results in a plurality of transmission interfaces in an intra-vehicle network. Information exchange between the interfaces requires interface conversion. The conversion between different interfaces greatly increases complexity of the intra-vehicle network, especially in a high-speed communication scenario.

SUMMARY

This disclosure provides a PCIe-based data transmission method and apparatus, so that endpoints in a PCIe system can communicate with each other without using a root, thereby reducing complexity of an intra-vehicle network.

According to a first aspect, an embodiment of this disclosure provides a PCIe-based data transmission method, including a first node that encapsulates data into a transaction layer packet (TLP) and then sends the TLP to a second node. The TLP includes a packet header part. A first field and a second field of the packet header part are used to indicate first encapsulation information, and the first encapsulation information includes a data type of the data and at least one encapsulation parameter corresponding to the data type. In this embodiment of this disclosure, the first field and the second field are used to indicate the information required for transmitting the data, such as the data type and the encapsulation parameter corresponding to the data type, so that endpoints can communicate with each other even if a root is not used, thereby reducing complexity of an intra-vehicle network.

In a possible design, a value of a bit set indicates the first encapsulation information, and the bit set includes a bit in the first field and a bit in the second field. In the foregoing design, the first field and the second field are jointly encoded, so that the TLP can indicate the information required for transmitting the data, and thus, the endpoints can communicate with each other even if the root is not used.

In a possible design, the first field indicates the data type, and the second field indicates the at least one encapsulation parameter. In the foregoing design, the first field and the second field are separately indicated, so that when parsing one of the fields, a destination endpoint can determine whether to use a solution provided in this disclosure.

In a possible design, the first field is a type field, and the second field is a format (Fmt) field. Alternatively, the first field is a Fmt field, and the second field is a type field. In the foregoing design, the type field and the Fmt field are reused, so that a change to a TLP structure is small.

In a possible design, a third field of the packet header part carries second encapsulation information, and the second encapsulation information includes another encapsulation parameter, rather than the encapsulation parameter included in the first encapsulation information, of encapsulation parameters corresponding to the data type. Based on the foregoing design, the TLP can indicate more encapsulation information.

In a possible design, the third field is byte 4 to byte 15 or byte 4 to byte 11 of the packet header part. Because the byte 4 to byte 15 or byte 4 to byte 11 of the packet header part indicate different content based on different type fields, when the type field and the Fmt field are used to indicate the first encapsulation information, the third field may be used to carry some or all encapsulation parameters.

In a possible design, the data type includes at least one of the following: an image, audio, control information, stream write (SWRITE), and security.

In a possible design, encapsulation parameters corresponding to the image may include an image data type, a pixel bit quantization depth, resolution, and segment indication information.

In a possible design, encapsulation parameters corresponding to the audio may include a sampling quantization format, a sampling frequency, a quantization depth, and a quantity of channels/channels.

In a possible design, encapsulation parameters corresponding to the control information may include a type of the control information and a quantity of each type of control information.

In a possible design, encapsulation parameters corresponding to the security may include a message type, a format indication, and whether a message is encrypted.

In a possible design, an encapsulation parameter corresponding to the SWRITE may include an alignment mode.

In a possible design, the first field is a reserved value. Alternatively, the second field is a reserved value. Alternatively, both the first field and the second field are reserved values. In the foregoing design, the reserved value is used, so that a PCIe system can be compatible with an original data transmission method and the data transmission method provided in this disclosure.

In a possible design, the TLP may carry information about the destination endpoint, such as an address of the destination endpoint and an identification (ID) of the destination endpoint. Based on the foregoing design, the second node may determine a routing path based on the information about the destination endpoint, so that the second node may send the TLP to the destination endpoint according to the routing path without using the root.

According to a second aspect, an embodiment of this disclosure provides a PCIe-based data transmission method, including a second node that receives a first TLP sent by a first node. The second node sends a second TLP to a third node. A first field and a second field of a packet header part of a TLP are used to indicate first encapsulation information, the first encapsulation information includes a data type of data carried in the TLP and at least one encapsulation parameter corresponding to the data type, and the TLP includes the first TLP and/or the second TLP. In this embodiment of this disclosure, the first field and the second field are used to indicate the information required for transmitting the data, such as the data type and the encapsulation information corresponding to the data type, so that endpoints can communicate with each other even if a root is not used, thereby reducing complexity of an intra-vehicle network.

In a possible design, the first TLP and the second TLP may be a same TLP, or the first TLP and the second TLP may be different TLPs.

In a possible design, the first TLP and the second TLP include same data, or same data content.

In a possible design, a value of a bit set indicates the first encapsulation information, and the bit set includes a bit in the first field and a bit in the second field. In the foregoing design, the first field and the second field are jointly encoded, so that the TLP can indicate the information required for transmitting the data, and thus, the endpoints can communicate with each other even if the root is not used.

In a possible design, the first field indicates the data type, and the second field indicates the at least one encapsulation parameter. In the foregoing design, the first field and the second field are separately indicated, so that when parsing one of the fields, the third node can determine whether to use a solution provided in this disclosure.

In a possible design, the first field is a type field, and the second field is a Fmt field, or the first field is a Fmt field, and the second field is a type field. In the foregoing design, the type field and the Fmt field are reused, so that a change to a TLP structure is small.

In a possible design, a third field of the packet header part carries second encapsulation information, and the second encapsulation information includes another encapsulation parameter, rather than the encapsulation parameter included in the first encapsulation information, of encapsulation parameters corresponding to the data type. Based on the foregoing design, the TLP can indicate more encapsulation information.

In a possible design, the third field is byte 4 to byte 15 or byte 4 to byte 11 of the packet header part. Because the byte 4 to byte 15 or byte 4 to byte 11 of the packet header part indicate different content based on different type fields, when the type field and the Fmt field are used to indicate the first encapsulation information, the third field may be used to carry some or all encapsulation parameters.

In a possible design, the data type includes at least one of the following: an image, audio, control information, SWRITE, and security.

In a possible design, encapsulation parameters corresponding to the image may include an image data type, a pixel bit quantization depth, resolution, and segment indication information.

In a possible design, encapsulation parameters corresponding to the audio may include a sampling quantization format, a sampling frequency, a quantization depth, and a quantity of channels/channels.

In a possible design, encapsulation parameters corresponding to the control information may include a type of the control information and a quantity of each type of control information.

In a possible design, encapsulation parameters corresponding to the security may include a message type, a format indication, and whether a message is encrypted.

In a possible design, an encapsulation parameter corresponding to the SWRITE may include an alignment mode.

In a possible design, the first field is a reserved value. Alternatively, the second field is a reserved value. Alternatively, both the first field and the second field are reserved values. In the foregoing design, the reserved value is used, so that a PCIe system can be compatible with an original data transmission method and the data transmission method provided in this disclosure.

In a possible design, before the second node sends the second TLP to the third node, the second node determines a routing path based on identity information of the third node. The first TLP carries the identity information of the third node. That the second node sends the second TLP to the third node includes that the second node sends the second TLP to the third node according to the routing path. Based on the foregoing design, the second node may determine the routing path based on the information about the third node, so that the second node may send the second TLP to the third node according to the routing path without using the root.

According to a third aspect, an embodiment of this disclosure provides a PCIe-based data receiving method, including a third node that receives a TLP sent by a second node, where a first field and a second field of a packet header part of the TLP are used to indicate first encapsulation information, the first encapsulation information includes a data type of data carried in the TLP and at least one encapsulation parameter corresponding to the data type. The third node obtains the data based on the first encapsulation information. In this embodiment of this disclosure, the first field and the second field are used to indicate the information required for transmitting the data, such as the data type and the encapsulation information corresponding to the data type, so that endpoints can communicate with each other even if a root is not used, thereby reducing complexity of an intra-vehicle network.

In a possible design, a value of a bit set indicates the first encapsulation information, and the bit set includes a bit in the first field and a bit in the second field. In the foregoing design, the first field and the second field are jointly encoded, so that the TLP can indicate the information required for transmitting the data, and thus, the endpoints can communicate with each other even if the root is not used.

In a possible design, the first field indicates the data type, and the second field indicates the at least one encapsulation parameter. In the foregoing design, the first field and the second field are separately indicated, so that when parsing one of the fields, a destination node can determine whether to use a solution provided in this disclosure.

In a possible design, the first field is a type field, and the second field is a Fmt field, or the first field is a Fmt field, and the second field is a type field. In the foregoing design, the type field and the Fmt field are reused, so that a change to a TLP structure is small.

In a possible design, the data type includes at least one of the following: an image, audio, control information, SWRITE, and security.

In a possible design, encapsulation parameters corresponding to the image may include an image data type, a pixel bit quantization depth, resolution, and segment indication information.

In a possible design, encapsulation parameters corresponding to the audio may include a sampling quantization format, a sampling frequency, a quantization depth, and a quantity of channels/channels.

In a possible design, encapsulation parameters corresponding to the control information may include a type of the control information and a quantity of each type of control information.

In a possible design, encapsulation parameters corresponding to the security may include a message type, a format indication, and whether a message is encrypted.

In a possible design, an encapsulation parameter corresponding to the SWRITE may include an alignment mode.

In a possible design, the first field is a reserved value. Alternatively, the second field is a reserved value. Alternatively, both the first field and the second field are reserved values. In the foregoing design, the reserved value is used, so that a PCIe system can be compatible with an original data transmission method and the data transmission method provided in this disclosure.

In a possible design, that the third node obtains the data based on the first encapsulation information includes that the third node determines a format of the data based on the first encapsulation information. The third node obtains the data based on the format. Based on the foregoing design, the third node may parse the TLP header to obtain a type and a format of the image, to obtain the data.

In a possible design, a third field of the packet header part carries second encapsulation information, and the second encapsulation information includes another encapsulation parameter, rather than the encapsulation parameter included in the first encapsulation information, of encapsulation parameters corresponding to the data type. Based on the foregoing design, the TLP can indicate more encapsulation information.

In a possible design, the third field is byte 4 to byte 15 or byte 4 to byte 11 of the packet header part. Because the byte 4 to byte 15 or byte 4 to byte 11 of the packet header part indicate different content based on different type fields, when the type field and the Fmt field are used to indicate the first encapsulation information, the third field may be used to carry some or all encapsulation parameters.

In a possible design, that the third node obtains the data based on the first encapsulation information includes that the third node determines a format of the data based on the first encapsulation information and the second encapsulation information. The third node obtains, from the TLP, the data based on the format. Based on the foregoing design, the third node may parse the TLP header to obtain the type and the format of the image, to obtain the data.

In a possible design, the TLP may carry information of the third node, for example, an address of the third node or an ID of the third node. Based on the foregoing design, the second node may determine a routing path based on the information about the third node, so that the second node may send the TLP to the third node according to the routing path without using the root.

According to a fourth aspect, this disclosure provides a PCIe-based data transmission apparatus. The apparatus may be a communications device, or may be a chip or a chip group in a communications device. The communications device may be a first node, a second node, or a third node. The apparatus may include a processing unit and a transceiver unit. When the apparatus is the communications device, the processing unit may be a processor, and the transceiver unit may be a transceiver. The apparatus may further include a storage module, and the storage module may be a memory. The storage module is configured to store instructions, and the processing unit executes the instructions stored in the storage module, so that the first node performs a corresponding function in the first aspect, the processing unit executes the instructions stored in the storage module, so that the second node performs a corresponding function in the second aspect, or the processing unit executes the instructions stored in the storage module, so that the third node performs a corresponding function in the third aspect. When the apparatus is the chip or the chip set in the communications device, the processing unit may be a processor, and the transceiver unit may be an input/output interface, a pin, a circuit, or the like. The processing unit executes instructions stored in a storage module, so that the first node performs a corresponding function in the first aspect, the processing unit executes instructions stored in a storage module, so that the second node performs a corresponding function in the second aspect, or the processing unit executes instructions stored in a storage module, so that the third node performs a corresponding function in the third aspect. The storage module may be a storage module (for example, a register or a cache) in the chip or the chipset, or may be a storage module (for example, a read-only memory (ROM) or a random-access memory (RAM)) that is in a network device and that is located outside the chip or the chipset.

According to a fifth aspect, a PCIe-based data transmission apparatus is provided. The apparatus includes a processor, a communications interface, and a memory. The communications interface is used to transmit information, and/or a message, and/or data between the apparatus and another apparatus. The memory is configured to store computer-executable instructions. When the apparatus runs, the processor executes the computer-executable instructions stored in the memory, to enable the apparatus to perform the data transmission method according to the first aspect or any one of the designs of the first aspect, the second aspect or any one of the designs of the second aspect, or the third aspect or any one of the designs of the third aspect.

According to a sixth aspect, this disclosure further provides a computer-readable storage medium. The computer-readable storage medium stores instructions. When the instructions are run on a computer, the computer is enabled to perform the data transmission method according to the first aspect or any one of the designs of the first aspect, the second aspect or any one of the designs of the second aspect, or the third aspect or any one of the designs of the third aspect.

According to a seventh aspect, this disclosure further provides a computer program product including instructions. When the computer program product runs on a computer, the computer is enabled to perform the data transmission method according to the first aspect or any one of the designs of the first aspect, the second aspect or any one of the designs of the second aspect, or the third aspect or any one of the designs of the third aspect.

According to an eighth aspect, this disclosure further provides a PCIe system. The system includes a first node, a second node, and a third node. The first node may perform a corresponding function in the first aspect, the second node may perform a corresponding function in the second aspect, and the third node may perform a corresponding function in the third aspect.

According to a ninth aspect, an embodiment of this disclosure provides a chip. The chip includes at least one processor and a communications interface. The processor is coupled to a memory, and is configured to read computer programs stored in the memory, to perform the data transmission method according to the first aspect or any one of the designs of the first aspect, the second aspect or any one of the designs of the second aspect, or the third aspect or any one of the designs of the third aspect of embodiments of this disclosure.

According to a tenth aspect, an embodiment of this disclosure provides a chip, including a communications interface and at least one processor. The processor runs to perform the data transmission method according to the first aspect or any one of the designs of the first aspect, the second aspect or any one of the designs of the second aspect, or the third aspect or any one of the designs of the third aspect of embodiments of this disclosure.

It should be noted that "coupling" in embodiments of this disclosure indicates a direct combination or an indirect combination of two components.

BRIEF DESCRIPTION OF DRAWINGS

FIG. 1 is a schematic diagram of an architecture of a PCIe system according to an embodiment of;

FIG. 2 is a schematic diagram of an architecture of another PCIe system according to an embodiment of;

DESCRIPTION OF EMBODIMENTS

PCIe is a high-speed short-distance communications interface widely applied to devices such as computers and test instruments. The PCIe can quickly and directly read data from and write data into a memory and provide high-bandwidth communication and therefore, some automobile enterprises extend a transmission distance of the PCIe and use the PCIe as a communications port for a large amount of data in an intra-vehicle network. However, due to a limitation of a PCIe working mechanism, the PCIe is not fully applicable to all scenarios in the intra-vehicle network.

Figure 1:
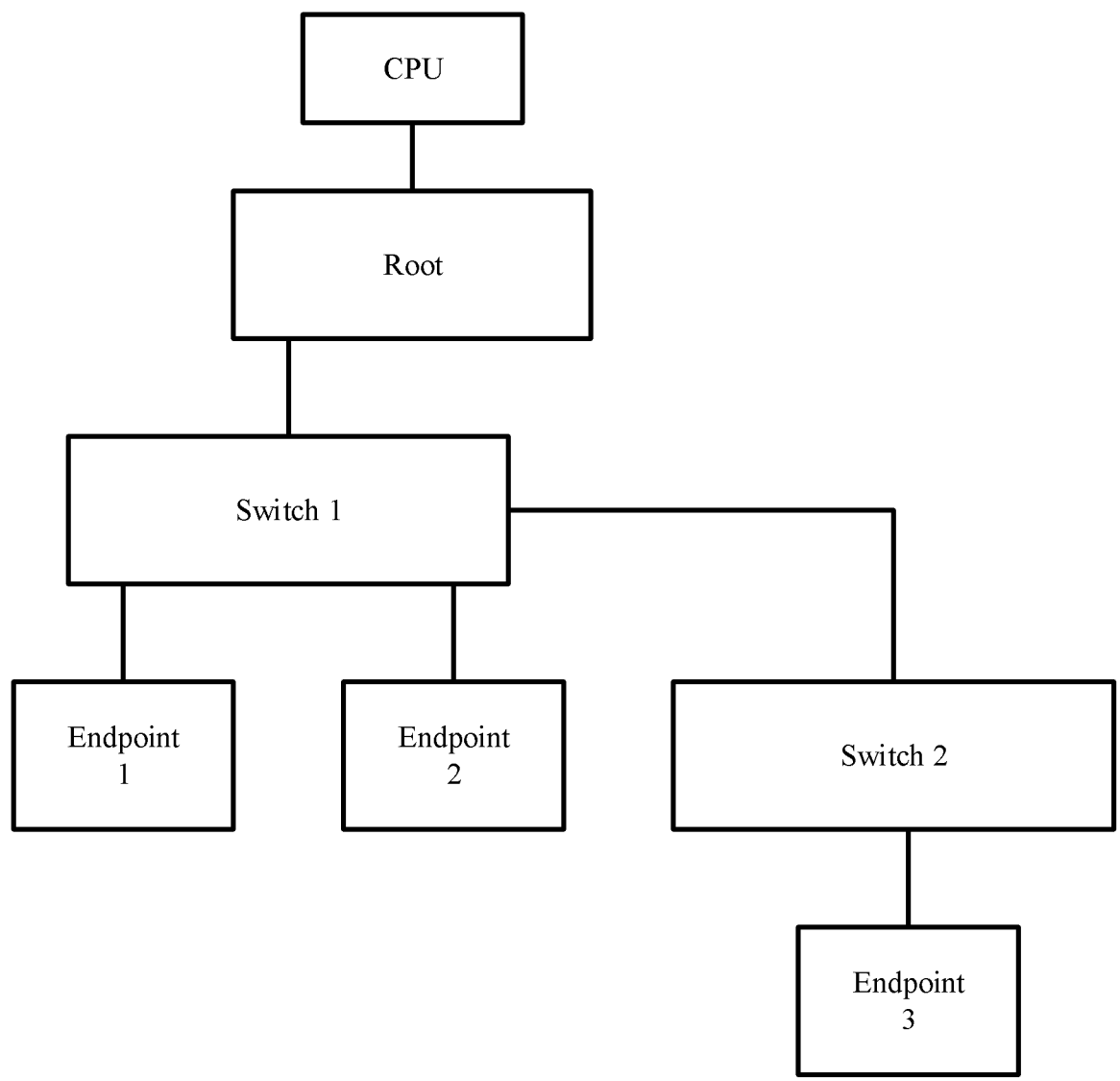

FIG. 1 shows a PCIe system. Main components of the system include a root, switches (a switch 1 and a switch 2 shown in FIG. 1), and endpoints (an endpoint 1, an endpoint 2, and an endpoint 3 shown in FIG. 1). The root is responsible for managing all buses (shown by black lines in FIG. 1) and nodes in the PCIe system, and is a bridge for communication between a CPU and another device in the system. The CPU communicates with all devices through the root. The switch functions as a bridge to connect the root, another switch, and the endpoint, and functions as a data forwarding node. The endpoint is an end device, for example, a peripheral, and is responsible for sending or receiving data.

Figure 2:
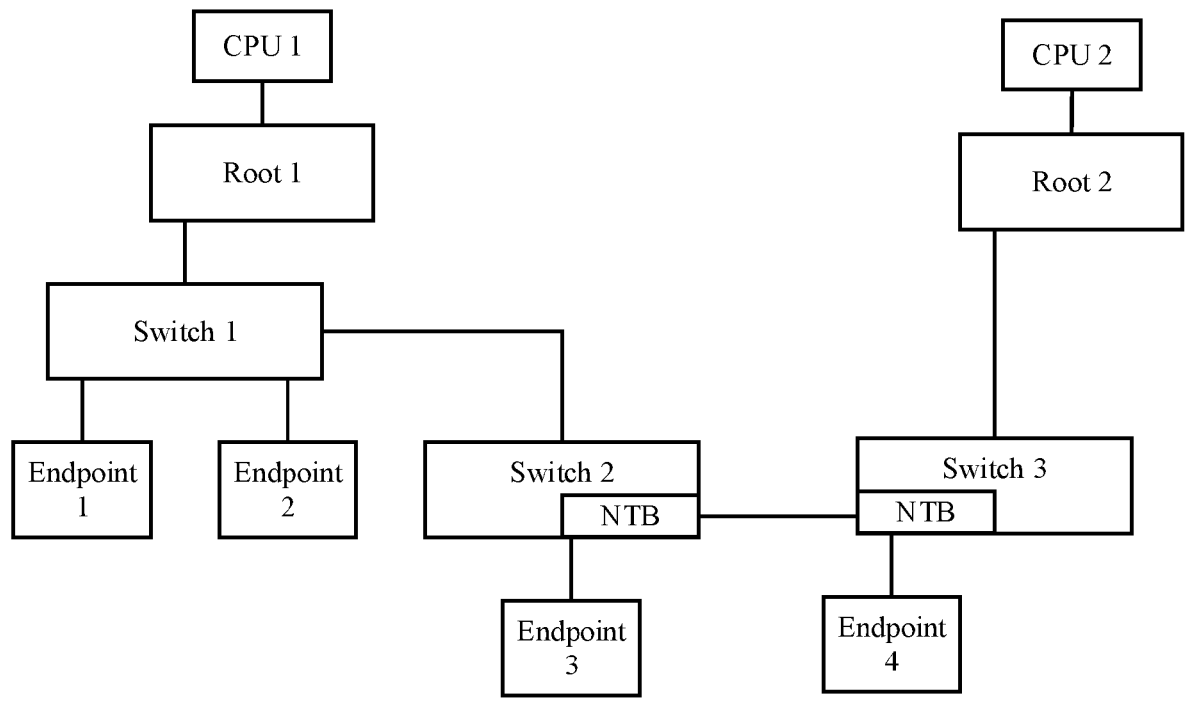

FIG. 2 shows a communications system including two PCIe systems. The two PCIe systems may communicate with each other through a non-transparent bridge (NTB). The NTB can be deployed on a switch. Because each device in a PCIe system is independently managed by its own root, addresses and IDs of devices in different PCIe systems may conflict with each other. To ensure that the two systems are connected and communicate with each other normally, bridging translation needs to be performed between the two systems to translate addresses or IDs. The NTB may be responsible for address or ID translation, so that the two PCIe systems communicate with each other.

In the PCIe system, endpoints need to communicate with each other through the root, because only the root knows functions of the endpoints and types of data supported by the endpoints. Information of the functions of the endpoints in the PCIe system, such as the supported data types and formats, is stored in endpoint configuration space. Only the root has permission to read the endpoint configuration space. Other endpoints and switches do not have permission to read the endpoint configuration space. Therefore, only the root knows the information about the data types and format supported by the endpoints, and other nodes cannot obtain the information. However, the endpoint in the PCIe system does not know a data type and a format supported by another endpoint, and cannot perform communication without using the root.

In FIG. 1, although an endpoint 1 and an endpoint 2 are connected to a same switch, the endpoint 1 and the endpoint 2 cannot directly communicate with each other through the switch. The endpoint 1/2 needs to first communicate with the root, and then find the endpoint 2/1 through the root. For example, a process in which the endpoint 1 sends data to the endpoint 2 is as follows. The endpoint 1 sends the data to a switch 1, the switch 1 sends the data to the root, the root determines, based on a function of each endpoint, that a data receiver is the endpoint 2, the root sends the data to the switch 1, and the switch 1 sends the data to the endpoint 2.

A mechanism in which the endpoints in the PCIe system communicate with each other through the root is not applicable to many scenarios in the intra-vehicle network. For example, a ring intra-vehicle network requires that a sensor should be directly connected to a gateway, and data of the sensor should be switched and forwarded to different computing/display units through the gateway/a switch on the ring intra-vehicle network. Such intra-vehicle network architecture requires that the data of the sensor should be forwarded to any direction through the gateway/switch to provide communication link redundancy and ensure communication security in a vehicle. Therefore, the ring intra-vehicle network needs to use another interface. In this case, there are a plurality of transmission interfaces in the intra-vehicle network, and interface conversion is required for information exchange between the interfaces. Conversion between different interfaces greatly increases complexity of the intra-vehicle network.

Based on this, embodiments of this disclosure provide a PCIe-based data transmission method and apparatus, to resolve a problem in the conventional technology that there is the plurality of transmission interfaces in the intra-vehicle network and the complexity of the intra-vehicle network is high due to the mechanism in which the endpoints communicate with each other through the root. The method and apparatus are conceived based on a same technical concept. The method and the device have similar principles for resolving problems. Therefore, for implementations of the apparatus and the method, refer to each other. Details are not repeatedly described. The PCIe-based data transmission method and apparatus provided in embodiments of this disclosure may be applied to an intra-vehicle network, especially an intra-vehicle network of an autonomous vehicle, or may be applied to a PCIe system of another device.

To facilitate understanding of embodiments of this disclosure, the following describes a structure of a TLP in the PCIe Base Specification Revision 5.0 Version 1.0.

Figure 3:
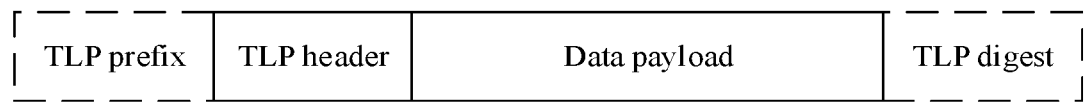
FIG. 3 is a schematic diagram of a structure of a TLP according to an embodiment.

The structure of the TLP may be shown in FIG. 3, and may include a TLP prefix, a TLP header, a data payload, and a TLP digest. A length of the TLP prefix may be H bytes, and H is an integer greater than 0. A length of the TLP header may be 12/16 bytes, and is used to indicate a PCIe service type. The data payload is a data part, and may be 0K to 4K bytes in length. A length of the TLP digest may be four bytes, and indicated content may be a cyclic redundancy check (end-to-end 32 bit cyclic redundancy check (ECRC)). For example, the ECRC may be a cyclic redundancy check (CRC), and is used to check whether data packet transmission is correct.

Figure 4:
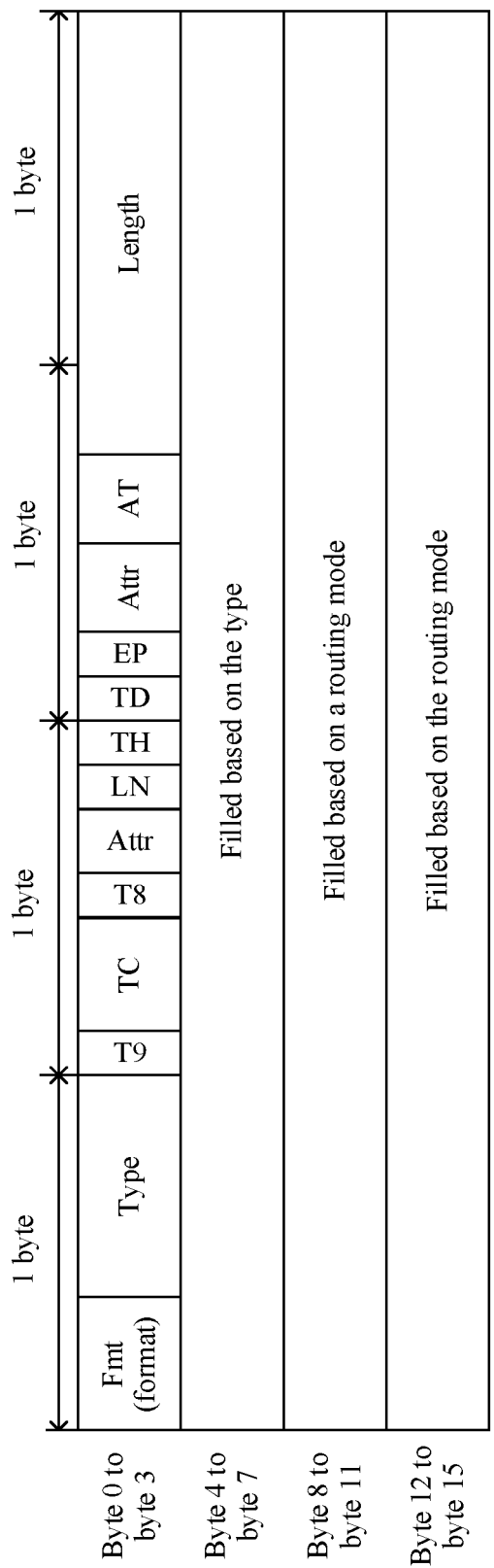
FIG. 4 is a schematic diagram of a structure of a TLP header according to an embodiment.

A 16-byte TLP header is used as an example. A structure of the TLP header may be shown in FIG. 4, and the TLP header includes the following content.

Format (Fmt) field: A length of the field may be three bits, and the field is used to indicate a length of the TLP header and whether the TLP includes a data payload part. The length of the TLP header may be of two types, and whether the TLP includes the data payload may be two cases: yes and no. Therefore, the Fmt field may indicate four types of information. The length of the TLP header is a first length and the TLP includes the data payload, the length of the TLP header is a first length and the TLP does not include the data payload, the length of the TLP header is a second length and the TLP includes the data payload, or the length of the TLP header is a second length and the TLP does not include the data payload. In addition, the Fmt field may further indicate the TLP prefix. The Fmt field includes three bits and eight state values in total, where five of the eight state values may be used to indicate the foregoing five types of information, and remaining three state values are reserved. For example, five state values 000, 001, 010, 011, and 100 may be used to indicate the foregoing five types of information, and remaining three state values 101, 110, and 111 are reserved.

Type field: The type field includes five bits, and is used to indicate service types of the TLP. There are six types of PCIe services: memory read/write, input/output (I/O) read/write, configuration read/write, message request, completion, and an atomic operation. The type field includes the five bits and 32 state values in total. In the PCI Express Base Specification Revision 5.0 Version 1.0, 19 state values are used to indicate the service types of the TLP, and remaining 13 state values are reserved. For example, 00000, 00001, 00010, 00100, 00101, 11011, 10000 to 10111, 01010, 01011, 01100, 01101 and 01110 may be used to indicate the service types of the TLP, and remaining 13 state values 00011, 00110, 00111, 01000, 01001, 01111, 11000 to 11010 and 11100 to 11111 are reserved.

T9/T8: reserved bit.

Priority (traffic class (TC)) field: The priority field is used to indicate a scheduling priority.

Attribute (Attr) field: The attribute field is used to indicate a TLP attribute. The TLP attribute may refer to a TLP processing manner, for example, ordering processing or hardware coherency management (snoop).

Lightweight notification (LN) field: Lightweight notification is a simple read/write manner defined by the PCIe.

TLP processing hints (TH) field: The TLP processing hints field is used to indicate whether there are processing hints (PHs) at a tail of the TLP header.

TLP digest indication (indicates presence of TLP digest (TD)) field: The TLP digest indication field is used to indicate whether a tail of the TLP includes the TLP digest.

Poisoned data (EP): The poisoned data is used to indicate whether the TLP is poisoned data.

Address type (AT): The address type is used to indicate whether an address needs to be translated.

Length: The length is used to indicate a data payload length, and may use four bytes as a minimum unit.

Byte 4 to byte 7: The byte 4 to byte 7 are defined based on a service type, namely, based on a service type indicated by the type field, and the byte 4 to byte 7 may indicate content corresponding to the service type.

Byte 8 to byte 15: The byte 8 to byte 15 are filled with an address or an ID based on different routing modes and different content. The byte 8 to byte 11 may be filled with an address of a destination node or an ID of the destination node, and byte 12 to byte 15 may be filled with an address of a source node or an ID of the source node. Alternatively, the byte 8 to byte 11 may be filled with an address of a source node or an ID of the source node, and byte 12 to byte 15 may be filled with an address of a destination node or an ID of the destination node.

It may be understood that a structure of a 12-byte TLP header is similar to the structure type of the 16-byte TLP header, and a difference lies in that, in the 16-byte TLP header, the byte 4 to byte 7 are defined based on the service type, and the byte 8 to byte 15 are filled with address information, while in the 12-byte TLP header, byte 4 to byte 7 are defined based on a service type, and byte 8 to byte 11 are filled with address information.

The method provided in embodiments of this disclosure is based on the TLP structure disclosed in the PCI Express Base Specification Revision 5.0 Version 1.0. A "reserved value" in embodiments of this disclosure may be an unused state value in the PCI Express Base Specification Revision 5.0 Version 1.0, for example, the three state values 101, 110, and 111 in the Fmt field. The "reserved value" may also be referred to as a "reserve value". A "reserved bit" in embodiments of this disclosure may refer to a bit that is not used in the TLP in the PCI Express Base Specification Revision 5.0 Version 1.0, for example, T8/T9 in the TLP header. The "reserved bit" may also be referred to as a "reserved bit", a "reserved bit", or the like.

It may be understood that, in a subsequent evolved version, the "reserved value" in embodiments of this disclosure may also refer to a bit that is not used in the TLP in the corresponding evolved version. This is not limited in embodiments of this disclosure.

The following describes terms related to embodiments of this disclosure.

A data type may include but is not limited to an image, audio, control information, SWRITE, security, or the like.

Encapsulation parameters corresponding to a data type may be used to represent an attribute of the data type. For example, if the data type is an image, the encapsulation parameters may include but are not limited to the following four parameters: image data type: RAW, red, green, and blue (RGB), luma, blue projection, and red projection (YUV), embedded data, a compressed image, a target contour (object) in the image, and the like, pixel bit quantization depth: for example, 12, 20, and 24, resolution: for example, 1080p, 2K, and 4K, and segment indication information: An image sensor outputs a row of images at a time. For images with high resolution, a row of the images cannot be transmitted in a TLP at a time, and a row of the images needs to be divided into several TLPs for transmission. The segment indication information is used to indicate which segment of the current line the current TLP is.

If the data type is audio, the encapsulation parameters may include but are not limited to the following four types of parameters: sampling quantization format: such as floating-point quantization and integer quantization, sampling frequency: for example, 24 kilohertz (kHz) and 48 kHz, quantization depth: for example, 8 bits or 12 bits for each sample, and quantity of audio channels/channels: It is used to indicate a quantity of audio channels/channels included in a current data packet.

If the data type is control information, the encapsulation parameters may include but are not limited to the following two types of parameters: type of the control information: for example, an Inter-Integrated Circuit (I2C), a general-purpose input/output (GPIO), and a serial peripheral interface (SPI), and quantity of control information of each type: For example, a current data packet includes three I2Cs and eight GPIOs.

If the data type is security, the encapsulation parameters may include but are not limited to the following three types of parameters: message type: security establishment requires a plurality of message interactions, and each interaction message is of a different type, for example, an authentication message or an encryption message, format indication: grouping of bits in a message and meaning of each group, and encrypted or not: whether a current data packet is encrypted. If the data type is SWRITE, the encapsulation parameters may include but are not limited to the following one parameter: alignment mode: 4-byte or 8-byte alignment.

The foregoing data types are merely examples for description, and, in a specific implementation, are not limited to the data types listed in embodiments of this disclosure. The encapsulation parameters corresponding to the foregoing data types are merely examples for description. In a specific implementation, the foregoing data types may also correspond to another encapsulation parameter. This is not limited herein.

It may be understood that, in embodiments of this disclosure, the "data type" is merely an example name, and may alternatively be named another name in a specific implementation, for example, may alternatively be referred to as a data service type. Alternatively, the data type may also be referred to as A. A may be understood as the data type in embodiments of this disclosure provided that A has a same or similar meaning as the data type in embodiments of this disclosure. The "encapsulation parameter" is merely an example name, and may alternatively be named as another name in a specific implementation, for example, may be referred to as an attribute, or an attribute parameter, or may be referred to as B. B may be understood as the encapsulation parameter in embodiments of this disclosure provided that B has a same or similar meaning as the encapsulation parameter in embodiments of this disclosure.

It should be understood that, in embodiments of this disclosure, "at least one" means one or more, and "a plurality of" means two or more. The term "and/or" describes an association relationship between associated objects, and represents that three relationships may exist. For example, A and/or B may represent the following cases: only A exists, both A and B exist, and only B exists, where A and B may be singular or plural. The character "/" usually represents an "or" relationship between the associated objects. "At least one of the following items (pieces)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

It should be understood that, in descriptions of this disclosure, terms such as "first" and "second" are merely used for a purpose of distinguishing for description, and should not be construed as indicating or implying relative importance, nor as indicating or implying a sequence.

The following describes in detail embodiments of this disclosure with reference to accompanying drawings.

Figure 5:
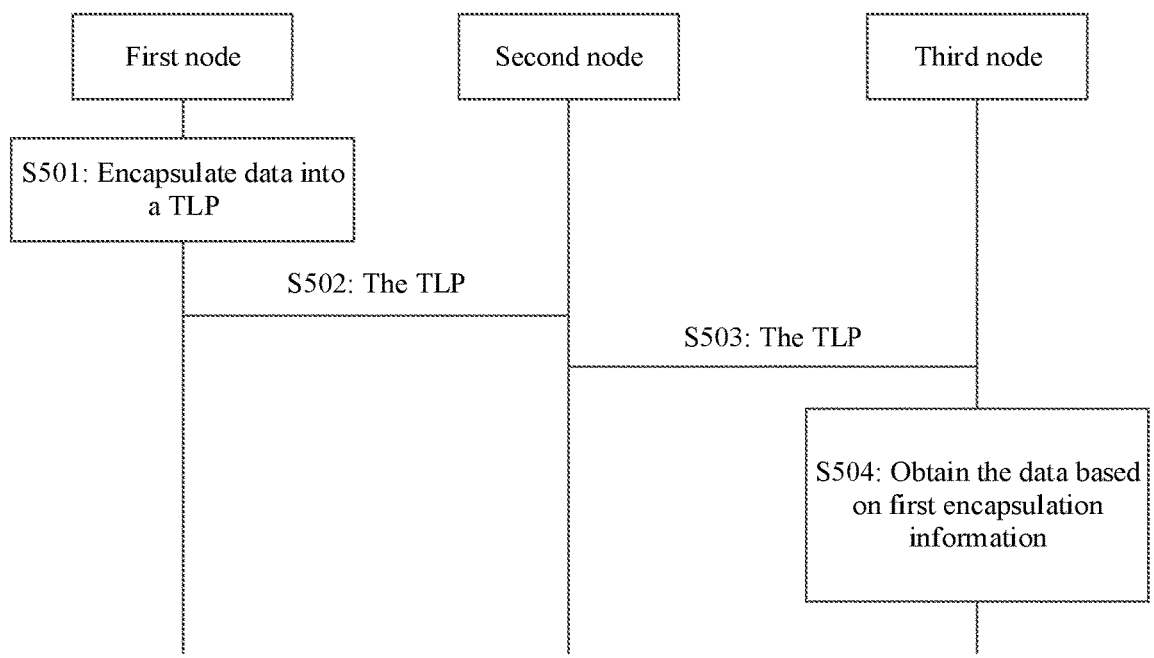
FIG. 5 is a schematic flowchart of a PCIe system-based data transmission system according to an embodiment.

This disclosure provides a PCIe-based data transmission method. The method may be applied to a PCIe system, for example, the PCIe system shown in FIG. 1 or the PCIe system shown in FIG. 2. As shown in FIG. 5, the method includes the following steps.

S501: A first node encapsulates data into a TLP, where the TLP includes a TLP header. A first field and a second field of the TLP header are used to indicate first encapsulation information, and the first encapsulation information includes a data type of the data and at least one encapsulation parameter corresponding to the data type. The first node may be an endpoint in the PCIe system, or may be a switch in the PCIe system.

The data may be carried in a data payload part of the TLP.

Figure 6:
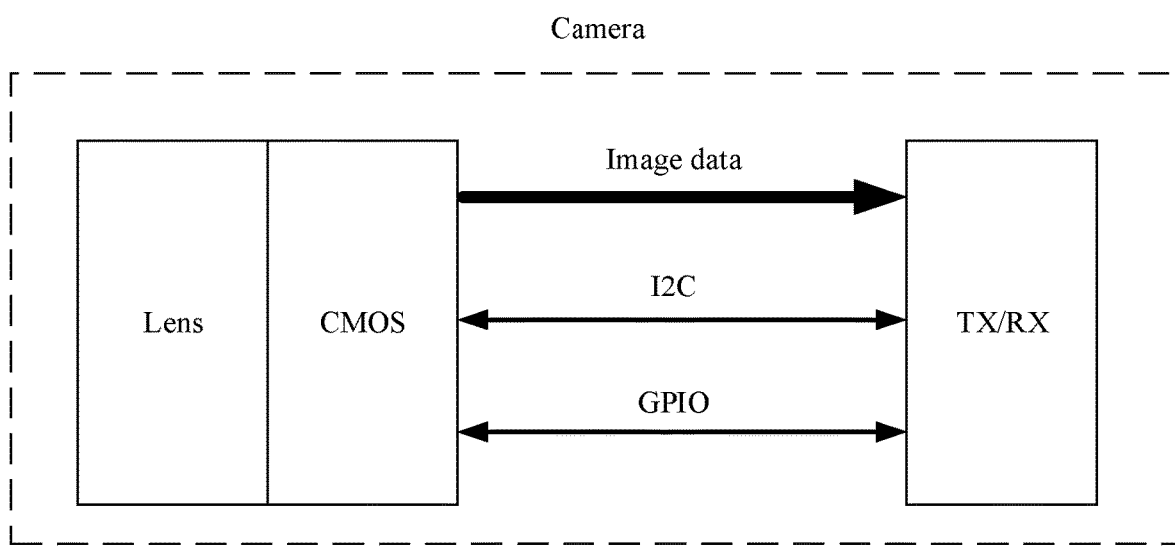
FIG. 6 is a schematic diagram of a structure of a camera according to an embodiment.

In some embodiments, the first node may be an endpoint, or may be a chip in the endpoint. For example, the first node may be a transmission node (for example, transmission end (TX)/receiving end (RX)) in the endpoint. A camera is used as an example. A structure of the camera may be shown in FIG. 6, and includes a lens, a photosensitive element (complementary metal oxide semiconductor (CMOS)), TX/RX, and the like. The CMOS is configured to collect image data by using the lens, and send the image data by using the TX/RX. The first node may be the camera, or may be the TX/RX in the camera. If the first node is the endpoint, the data to be encapsulated by the first node may be data collected by the first node. For example, if the first node is a camera, the data to be encapsulated may be image data collected by the camera, or the like. If the first node is a microphone, the data to be encapsulated may be audio data collected by the microphone, or the like. If the first node is a transmission node in the endpoint, the data to be encapsulated by the first node may be data collected by a sensor chip in the endpoint. For example, in FIG. 6, the data to be encapsulated by the first node may be the image data collected by the CMOS.

In a possible implementation, before step S501, the first node may extract an encapsulation parameter of the data. For example, in FIG. 6, if the first node is the camera, the first node may determine an image data type, a pixel quantization depth, resolution, and the like of the collected image data, may calculate an amount of data of each row of images based on the image data type, the pixel quantization depth, the resolution, and the like, may obtain, with reference to a maximum data bearing capacity of each TLP in the PCIe, a quantity of TLPs required for transmitting a row of images, to determine a segmentation mode of the images, so that segment indication information can be determined based on the segmentation mode. If the first node is the TX/RX in the camera, the first node may receive the image data collected by the CMOS, where the image data shows and carries encapsulation parameters such as an image data type, a pixel quantization depth, resolution, and the like. The first node may calculate an amount of data of each row of images based on the image data type, the pixel quantization depth, the resolution, and the like that are carried in the image data, may obtain, with reference to a maximum data bearing capacity of each TLP in the PCIe, a quantity of TLPs required for transmitting a row of images, to determine a segmentation mode of the images, so that segment indication information can be determined based on the segmentation mode.

For example, the first field may be a type field, and the second field may be a Fmt field. Alternatively, the first field is a Fmt field, and the second field is a type field. Certainly, the first field and the second field may alternatively be other fields. This is not further limited herein. For ease of description, the following uses an example in which the first field is a Fmt field and the second field is a type field for description.

In an example description, a reserved value of the Fmt field and all state values of the type field may be used to indicate the first encapsulation information. For example, three state values 101, 110, and 111 of the Fmt field and a total of 32 state values 00000 to 11111 of the type field are used. Therefore, a total of 3×32 state values may be used to indicate the first encapsulation information.

In another example description, all state values of the Fmt field and a reserved value of the type field may be used to indicate the first encapsulation information. For example, eight state values 000 to 111 of the Fmt field and 13 state values 00011, 00110, 00111, 01000, 01001, 01111, 11000 to 11010, and 11100 to 11111 of the type field are used. Therefore, a total of 8×13 state values may be used to indicate the first encapsulation information.

In still another example description, the reserved value of the Fmt field and the reserved value of the type field may be used to indicate the first encapsulation information. For example, three state values 101, 110, and 111 of the Fmt field and 13 state values 00011, 00110, 00111, 01000, 01001, 01111, 11000 to 11010 and 11100 to 11111 of the type field are used. Therefore, a total of 3×13 state values may be used to indicate the first encapsulation information.

Figure 7:
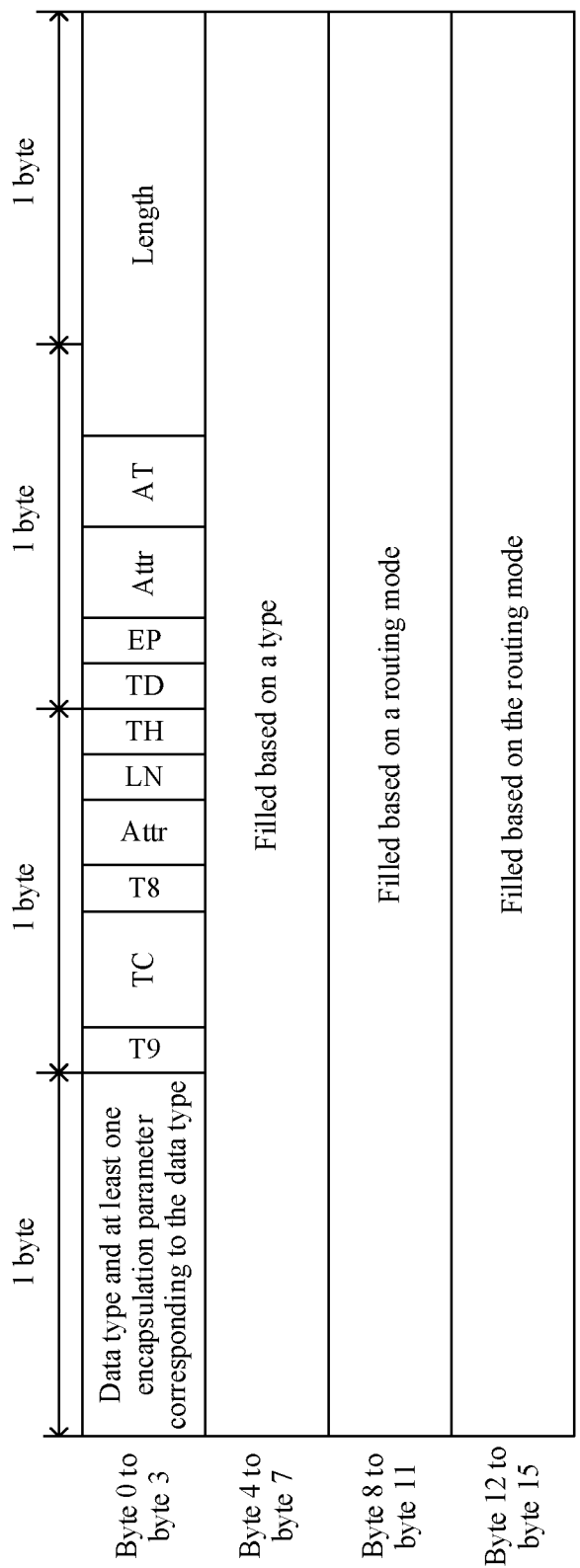
FIG. 7 is a schematic diagram for indicating first encapsulation information according to an embodiment.

In an implementation, the Fmt field and the type field may be uniformly encoded (or jointly encoded) to indicate the first encapsulation information. To be specific, a value of a bit set is used to indicate the first encapsulation information, and the bit set includes three bits of the Fmt field and five bits of the type field, so that a state value (for example, 10100000) of the eight bits may be used to indicate the first encapsulation information, as shown in FIG. 7.

In this implementation, a data type of data and at least one encapsulation parameter corresponding to the data type may be bound to obtain a plurality of information sets. An information set 1 includes: a data type is an image, an image type is YUV, image resolution is 2K, a pixel quantization depth is 12, and a current TLP is a first segment of a current row. An information set 2 includes: the data type is an image, the image type is YUV, the image resolution is 2K, the pixel quantization depth is 12, and the current TLP is a second segment of the current row. An information set 3 includes: the data type is an image, the image type is RGB, the image resolution is 4K, the pixel quantization depth is 12, the current TLP is the first segment of the current row, and the like. The state value of the bit set indicates the information set, so that a receive node can determine a corresponding information set based on the bit set.

Figure 8:
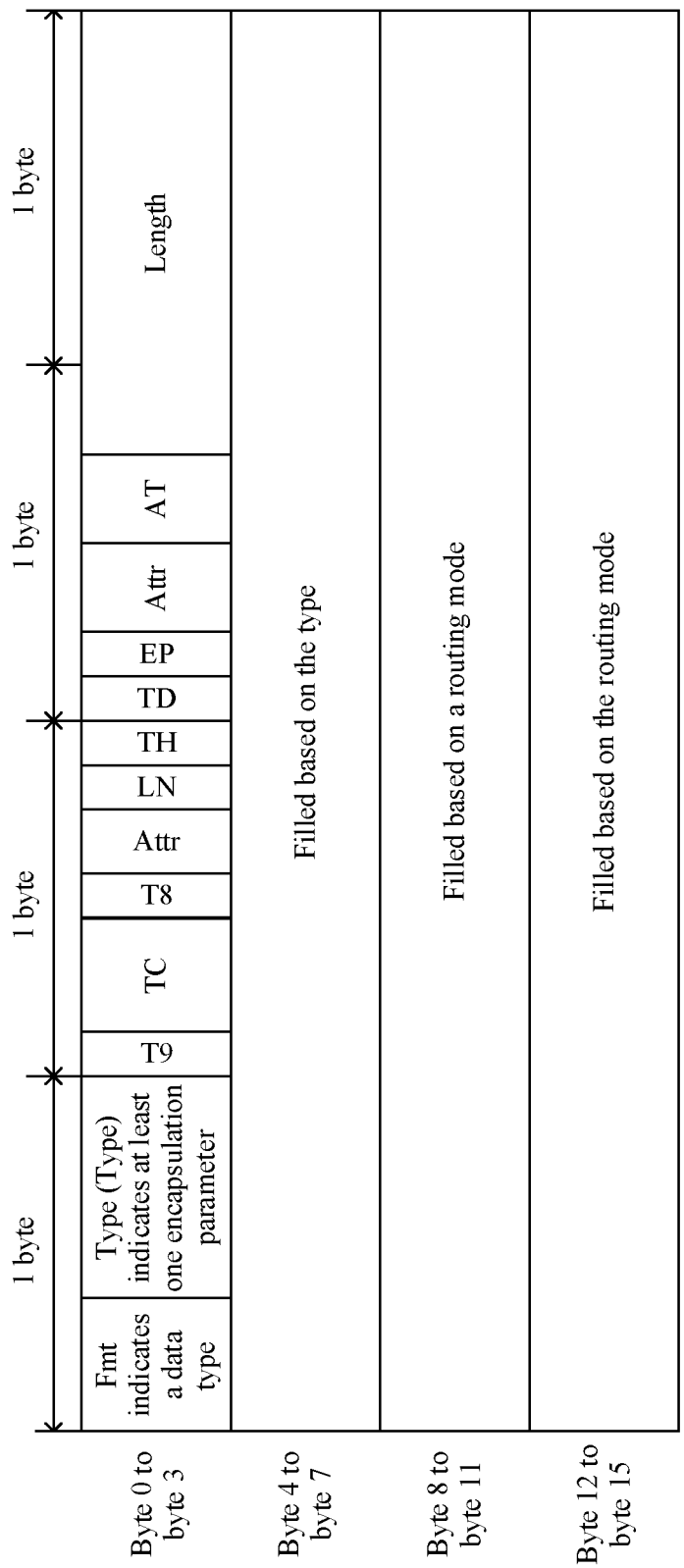
FIG. 8 is another schematic diagram for first encapsulation information according to an embodiment.

In another implementation, the Fmt field and the type field may indicate different information. For example, the Fmt field may indicate a data type, and the type field may indicate at least one encapsulation parameter corresponding to the data type, as shown in FIG. 8. For example, the data type is security. The Fmt field may indicate that the data type is security. For example, 101 indicates a security service. The type field may indicate a message type. For example, 00000 indicates an encryption establishment message, 00001 indicates an interface authentication message, 00010 indicates image encryption data, and 00011 indicates encrypted memory read.

In some embodiments, the TLP header may further include a third field. For example, the third field may be byte 4 to byte 15 of a 16-byte TLP header, or may be byte 4 to byte 11 of a 12-byte TLP header.

Figure 9:
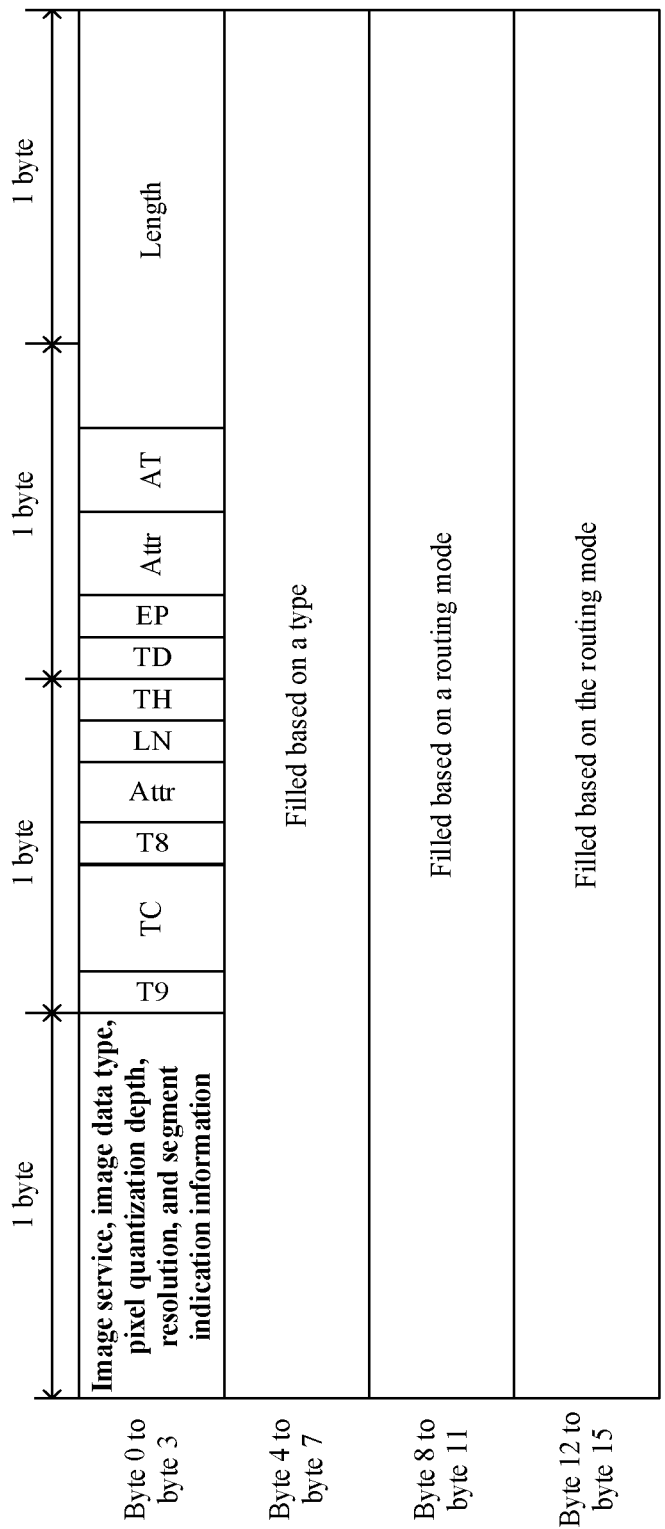
FIG. 9 is a schematic diagram of an image service according to an embodiment.
Figure 10:
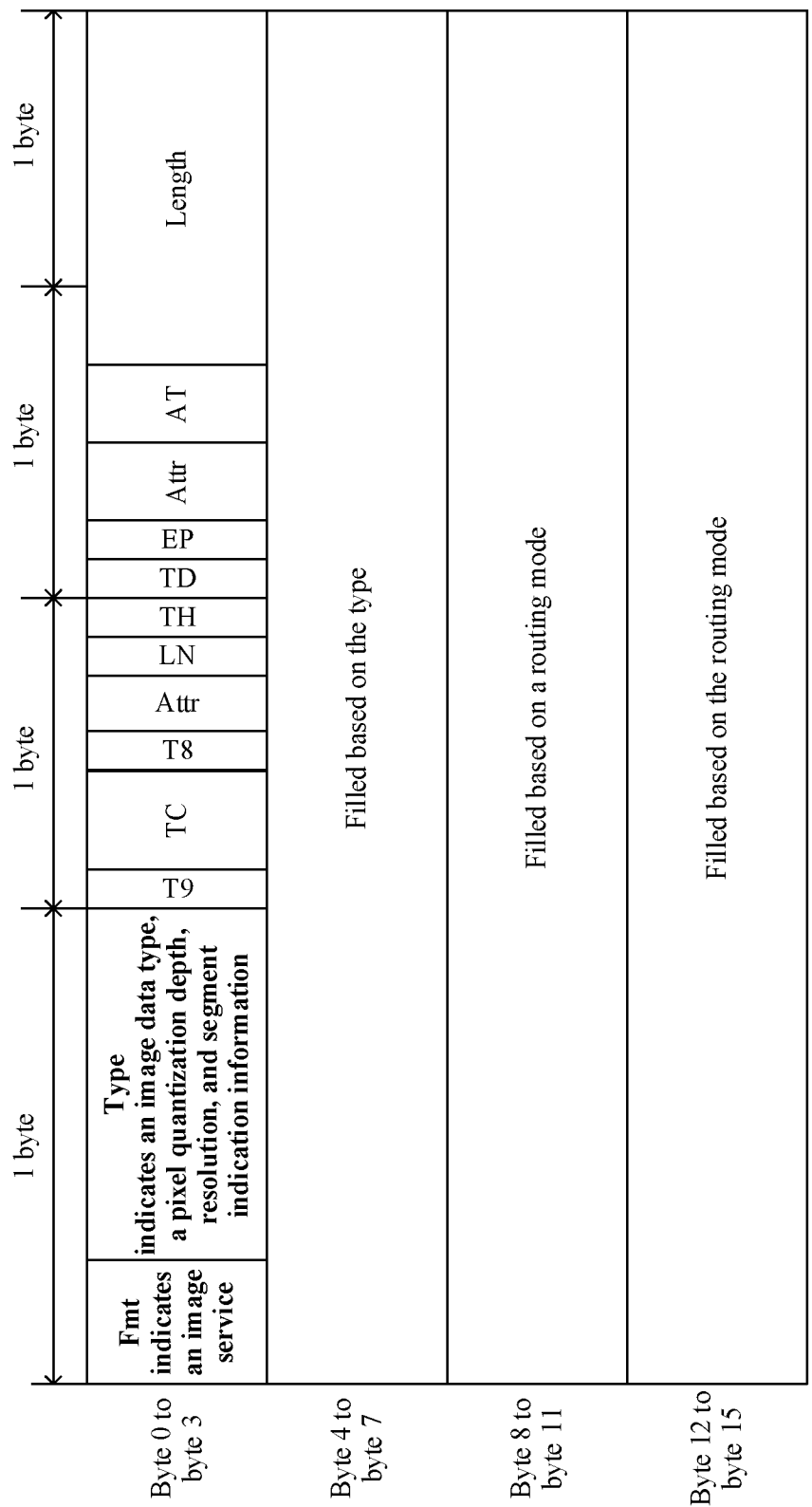
FIG. 10 is another schematic diagram of an image service according to an embodiment.

In a possible implementation, the TLP header may use the Fmt field and the type field to indicate a data type and encapsulation parameters corresponding to the data type. In this implementation, the third field may not carry the encapsulation parameters. The Fmt field and the type field may indicate the data type and the encapsulation parameters corresponding to the data type in a joint encoding manner, or the Fmt field and the type field may be used to separately indicate the data type and the encapsulation parameters corresponding to the data type. For example, the Fmt field indicates the data type, and a reserved value of the type field indicates the encapsulation parameters corresponding to the data type. For example, the data type is an image. The Fmt field and the type field indicate an image service, an image data type, a pixel quantization depth, resolution, and segment indication information, as shown in FIG. 9 or FIG. 10.

Figure 11:
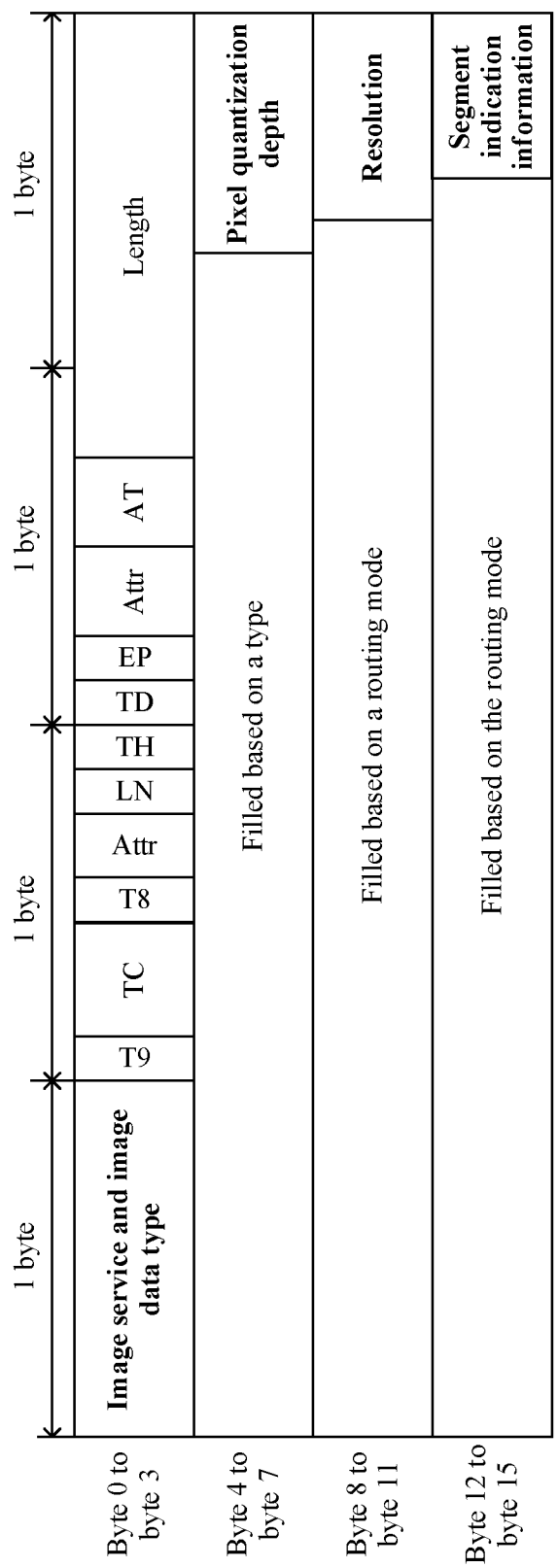
FIG. 11 is another schematic diagram of an image service according to an embodiment.
Figure 12:
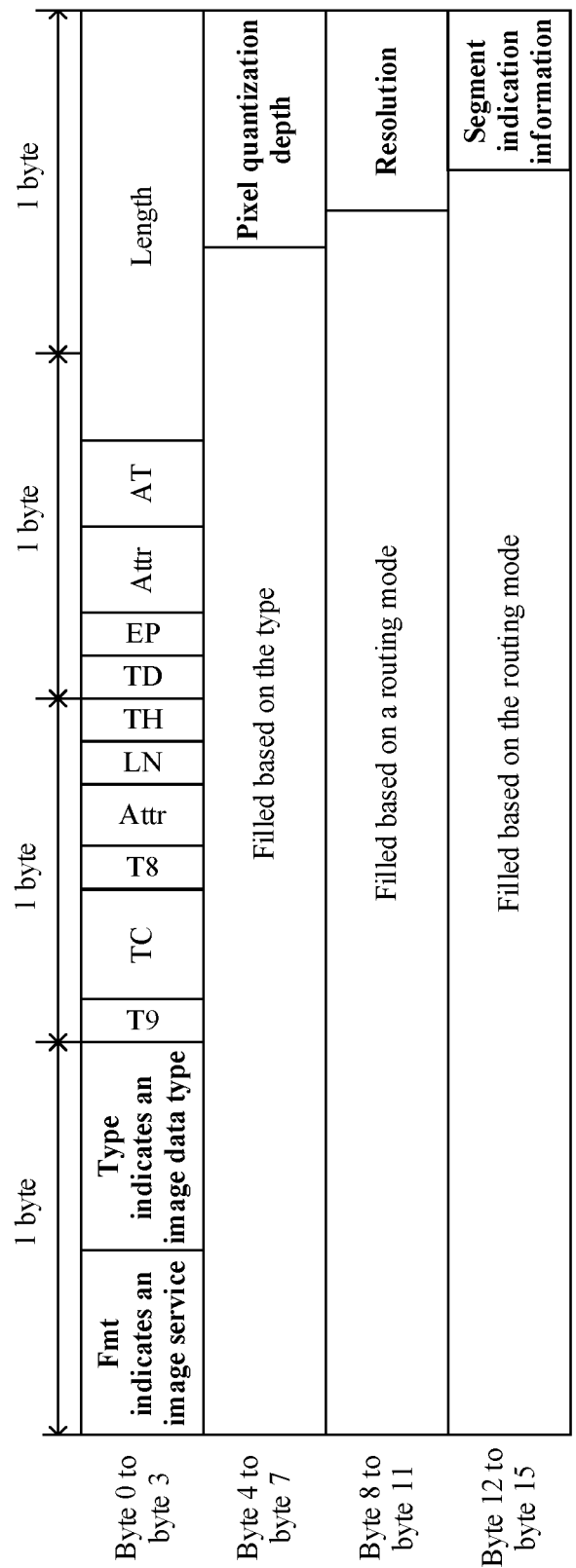
FIG. 12 is another schematic diagram of an image service according to an embodiment.

In another possible implementation, the TLP header may use the Fmt field and the type field to indicate the data type and some encapsulation parameters corresponding to the data type, and use the third field to carry some other encapsulation parameters corresponding to the data type. It may alternatively be understood that the third field may carry second encapsulation information, and the second encapsulation information includes another encapsulation parameter, rather than the encapsulation parameter included in the first encapsulation information, of the encapsulation parameters corresponding to the data type. The Fmt field and the type field may indicate the data type and some encapsulation parameters corresponding to the data type in a joint encoding manner, or the Fmt field and the type field may be used to separately indicate the data type and some encapsulation parameters corresponding to the data type. For example, the Fmt field indicates the data type, and a reserved value of the type field indicates some encapsulation parameters corresponding to the data type. For example, the data type is an image. The Fmt field and the type field indicate an image service and an image data type, and the third field indicates a pixel quantization depth, resolution, and segment indication information, as shown in FIG. 11 or FIG. 12. It should be understood that FIG. 11 or FIG. 12 is merely an example for description, and a length of each encapsulation parameter and a location of each encapsulation parameter in the TLP header are not limited.

Figure 13:
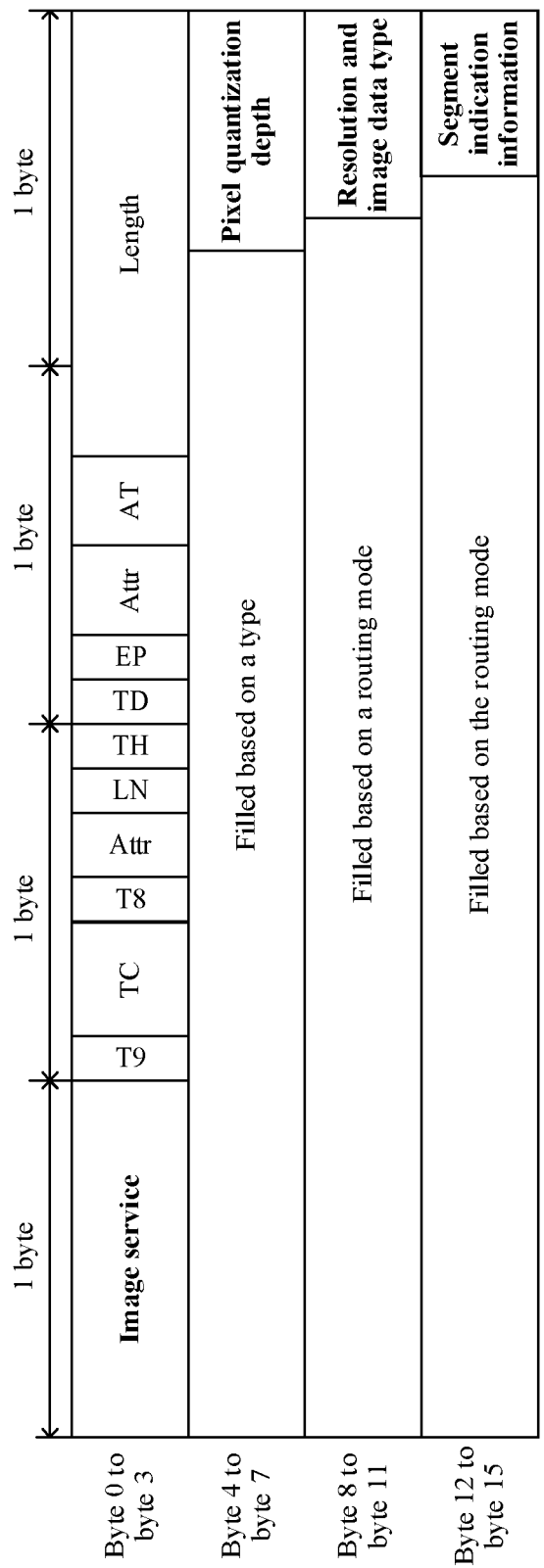
FIG. 13 is another schematic diagram of an image service according to an embodiment.
Figure 14:
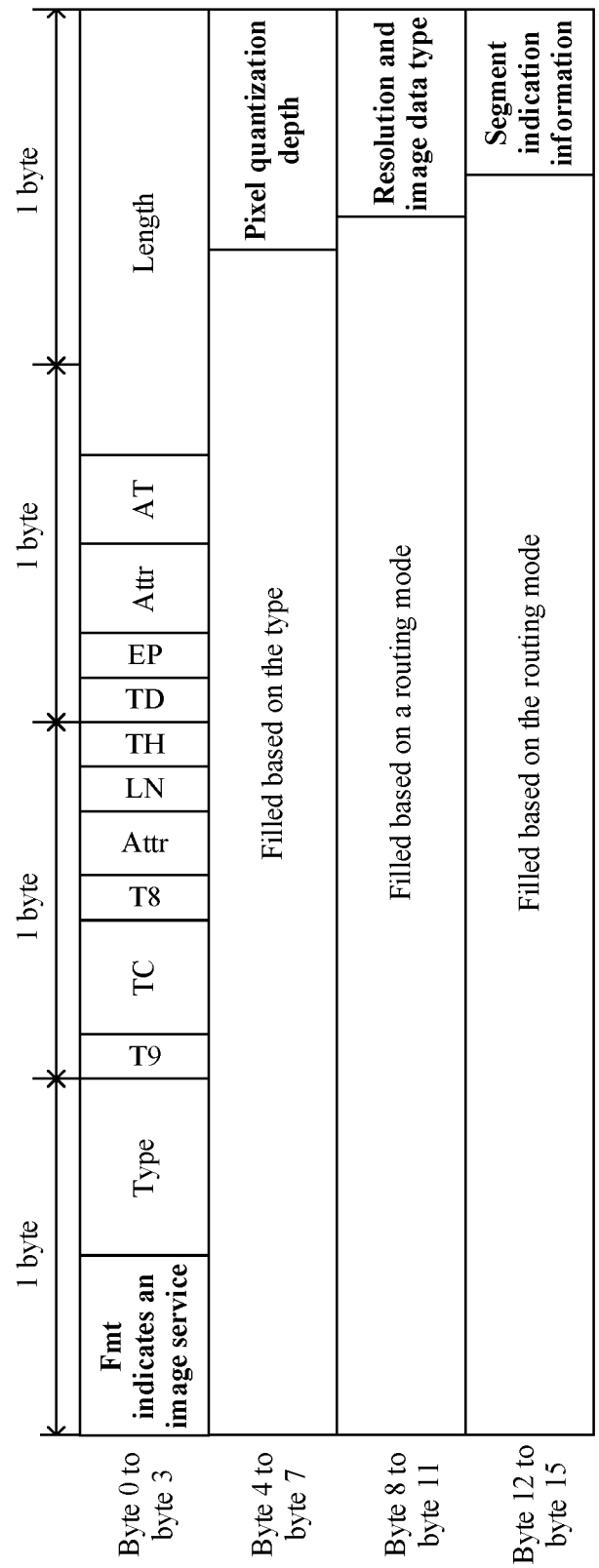
FIG. 14 is another schematic diagram of an image service according to an embodiment.
Figure 15:
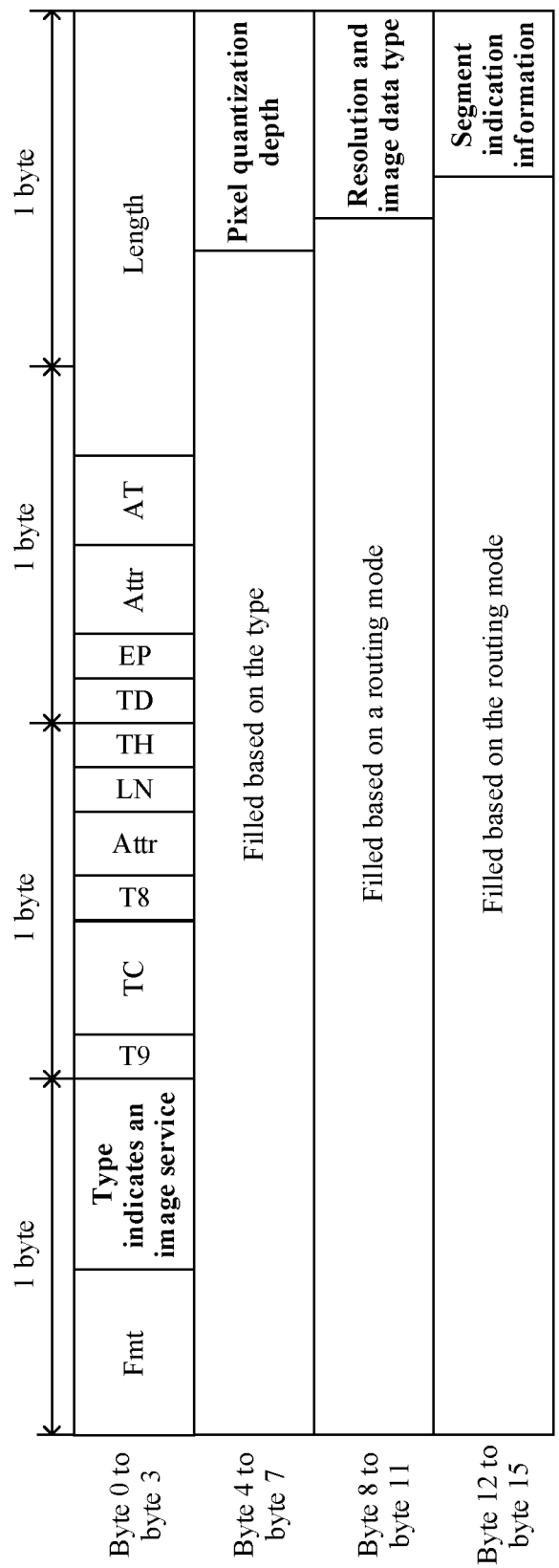
FIG. 15 is another schematic diagram of an image service according to an embodiment.

In yet another possible implementation, the TLP header may use the Fmt field and the type field to indicate the data type and use the third field to carry the encapsulation parameters corresponding to the data type. In this implementation, the Fmt field and the type field may not indicate the encapsulation parameters. The Fmt field and the type field may indicate the data type in a joint encoding manner, a reserved value of the Fmt field may be used to indicate the data type, or a reserved value of the type field may be used to indicate the data type. For example, the data type is an image. The Fmt field and the type field indicate an image service, and the third field indicates an image data type, a pixel quantization depth, resolution, and segment indication information, as shown in FIG. 13. Alternatively, the reserved value of the Fmt field indicates an image service, and the third field indicates an image data type, a pixel quantization depth, resolution, and segment indication information, as shown in FIG. 14. Alternatively, the reserved value of the type field indicates an image service, and the third field indicates an image data type, a pixel quantization depth, resolution, and segment indication information, as shown in FIG. 15. It should be understood that FIG. 14 or FIG. 15 is merely an example for description, and a length of each encapsulation parameter and a location of each encapsulation parameter in the TLP header are not limited.

The foregoing manner may be used to indicate a format of a service of an image, audio, control information, SWRITE, and security, a plurality of formats of a service of an image, audio, control information, SWRITE, and security, a plurality of formats of a plurality of services of an image, audio, control information, SWRITE, and security, a mix (for example, an image with security protection) of a plurality of services of an image, audio, control information, SWRITE, and security, or another service type and another format. This is not listed one by one herein.

In addition, the TLP may further carry identity information of a destination node (collectively referred to as a third node below), for example, an address and an ID of the third node. The TLP may further carry identity information of the first node, for example, an address and an ID of the first node. In an example, if a length of the TLP header is 16 bytes, byte 8 to byte 15 of the TLP header may carry identity information of the first node and the third node. If a length of the TLP header is 12 bytes, byte 8 to byte 11 of the TLP header may carry identity information of the first node and the third node. The third node may be an endpoint in the PCIe system, or may be a switch in the PCIe system.

S502: The first node sends the TLP to a second node. Correspondingly, the second node receives the TLP sent by the first node. The second node may be an endpoint in the PCIe system, or may be a switch in the PCIe system. In an example description, the second node may be a switch connected to the first node in the PCIe system.

S503: The second node sends a TLP to the third node. Correspondingly, the third node receives the TLP sent by the second node.

In an implementation, the TLP sent by the second node and the TLP sent by the first node are a same TLP. To be specific, after receiving the TLP sent by the first node, the second node forwards the TLP to the third node.

In another implementation, the TLP sent by the second node and the TLP sent by the first node are different TLPs. To be specific, after receiving the TLP sent by the first node, the second node processes the TLP, for example, changes source node information of the TLP from the identity information of the first node to identity information of the second node, and then sends a processed TLP to the third node. The TLP sent by the second node includes the same data or data content and the same encapsulation information as the data or data content and the encapsulation information carried in the TLP sent by the first node. For a manner in which the TLP sent by the second node carries the data and the encapsulation information, refer to related descriptions of step S501. Details are not described herein again.

In some embodiments, before step S503, the second node may determine a routing path based on the identity information of the third node. In this way, the second node may send the TLP to the third node according to the routing path.

S504: The third node obtains the data based on the first encapsulation information.

Further, the third node decapsulates, based on the first encapsulation information, the TLP sent by the second node, to obtain the data.

In a possible implementation, the third node may obtain the data type and the encapsulation parameters corresponding to the data type from the received TLP, determine, based on the data type and the encapsulation parameters corresponding to the data type, a format of the data carried in the TLP, and decapsulate the TLP based on the format.

In an implementation, the third node may determine, based on the Fmt field and the type field of the TLP header, the data type and the encapsulation parameters corresponding to the data type. For example, as shown in FIG. 9, the third node may determine, based on the Fmt field and the type field of the TLP header, that the data carried in the TLP is the image service, and obtain the image data type, the pixel quantization depth, the resolution, and the segment indication information of the image data carried in the TLP.

In another implementation, the third node may determine, based on the Fmt field and the type field of the TLP header, the data type and some encapsulation parameters corresponding to the data type, and determine, based on the third field of the TLP header, the remaining encapsulation parameters corresponding to the data type. For example, as shown in FIG. 11, the third node may determine, based on the Fmt field and the type field of the TLP header, that the data carried in the TLP is the image service, and obtain the image data type of the image data carried in the TLP, and the third node may obtain, based on the third field of the TLP header, the pixel quantization depth, the resolution, and the segment indication information of the image data carried in the TLP.

In yet another implementation, the third node may determine the data type based on the Fmt field and the type field of the TLP header, and determine, based on the third field of the TLP header, the encapsulation parameters corresponding to the data type. For example, as shown in FIG. 13, the third node may determine, based on the Fmt field and the type field of the TLP header, that the data carried in the TLP is the image service, and obtain, based on the third field of the TLP header, the image data type, the pixel quantization depth, the resolution, and the segment indication information of the image data carried in the TLP.

Figure 16:
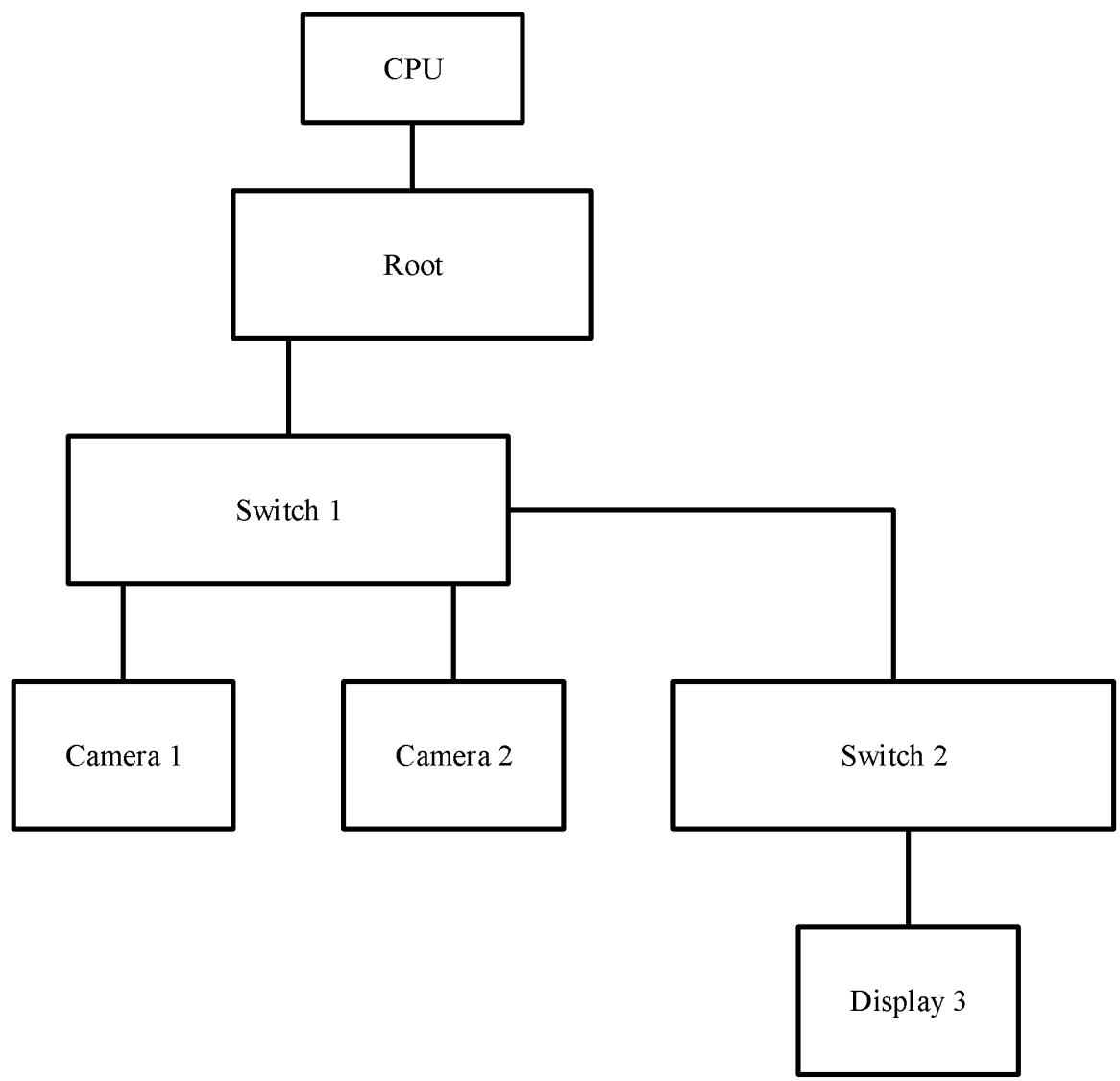
FIG. 16 is a schematic diagram of an architecture of a PCIe system according to an embodiment.

To better understand the solutions provided in embodiments of this disclosure, the following describes a data transmission process with reference to a PCIe system shown in FIG. 16. As shown in FIG. 16, content shot by a camera 1 (the camera 1 is shown in FIG. 16, and other cameras are similar) or a camera 2 needs to be displayed on a display 3. The camera 1/camera 2 may transmit data to a switch 1 and a switch 2 by using the data transmission method performed by the first node in the foregoing embodiment. The switch 1 may transmit the data to the switch 2 by using the data transmission method performed by the second node in the foregoing embodiment. The switch 2 may transmit the data to the display 3 by using the data transmission method performed by the second node in the foregoing embodiment. The display may obtain the data by using the data transmission method performed by the third node in the foregoing embodiment. The following uses an example in which a length of a TLP header is 16 bytes. A process in which the camera 1 transmits the data to the display is as follows.

A1: The camera 1 calculates an amount of data in each row of images based on an output image type (such as RGB and YUV), a quantity of quantized bits per pixel, and image resolution (such as 2K and 4K), determines a quantity of TLPs required for transmitting a row of images based on a maximum data bearing capacity of each TLP in a PCIe, and then determines a segmentation mode of the images.

A2: The camera 1 encapsulates the collected image data into a TLP.

For example, the camera 1 may encapsulate the data in any one of the following six manners.

Manner 1: The camera 1 may use a state value (for example, 10100000) after a Fmt field and a type field of the TLP header are uniformly encoded to indicate information required for image transmission, for example, indicate that a data type is an image service, an image data type of the image data, a pixel quantization depth of the image data, resolution of the image data, and segment indication information of the image data, as shown in FIG. 9. The camera 1 fills the data into a data payload part of the TLP. The camera 1 fills identity information (such as an ID and an address) of the camera 1 and identity information of the display into byte 8 to byte 15 of the TLP header.

Manner 2: The camera 1 may use a state value (for example, 10100100) after a Fmt field and a type field of the TLP header are uniformly encoded to indicate that a data type is an image service or an image data type of the image data, use byte 4 to byte 15 of the TLP header to indicate a pixel quantization depth of the image data, resolution of the image data and segment indication information of the image data, as shown in FIG. 11. The camera 1 fills the data into a data payload part of the TLP. The camera 1 fills identity information (such as an ID and an address) of the camera 1 and identity information of the display into byte 8 to byte 15 of the TLP header.

Manner 3: The camera 1 may use a state value (for example, 10101001) after a Fmt field and a type field of the TLP header are uniformly encoded to indicate that a data type is an image service, and use byte 4 to byte 15 of the TLP header to indicate an image data type of the image data, a pixel quantization depth of the image data, resolution of the image data, and segment indication information of the image data, as shown in FIG. 13. The camera 1 fills the data into a data payload part of the TLP. The camera 1 fills identity information (such as an ID and an address) of the camera 1 and identity information of the display into byte 8 to byte 15 of the TLP header.

Manner 4: The camera 1 may use a Fmt field of the TLP header to indicate that a data type is an image service, use a type field to indicate an image data type of the image data, a pixel quantization depth of the image data, resolution of the image data, and segment indication information of the image data, as shown in FIG. 10. The camera 1 fills the data into a data payload part of the TLP. The camera 1 fills identity information (such as an ID and an address) of the camera 1 and identity information of the display into byte 8 to byte 15 of the TLP header.

Manner 5: The camera 1 may use a Fmt field of the TLP header to indicate that a data type is an image service, use a type field to indicate an image data type of the image data, and use byte 4 to byte 15 of the TLP header to indicate a pixel quantization depth of the image data, resolution of the image data, and segment indication information of the image data, as shown in FIG. 12. The camera 1 fills the data into a data payload part of the TLP. The camera 1 fills identity information (such as an ID and an address) of the camera 1 and identity information of the display into byte 8 to byte 15 of the TLP header.

In the foregoing five manners, at least one of the Fmt field and the type field may use a reserved value. The following uses an example in which the Fmt field uses the reserved value in the foregoing five manners for description.

Manner 6: The camera 1 may use a reserved value of the Fmt field of the TLP header or a reserved value of the type field to indicate that the data type is an image, use byte 4 to byte 15 of the TLP header to indicate the image data type of the image data, the pixel quantization depth of the image data, the resolution of the image data, and the segment indication information of the image data. For example, the reserved value of the Fmt field indicates that the data type is the image, as shown in FIG. 14. For example, the reserved value of the type field indicates that the data type is the image, as shown in FIG. 15. The camera 1 fills the data into a data payload part of the TLP. The camera 1 fills identity information (such as an ID and an address) of the camera 1 and identity information of the display into byte 8 to byte 15 of the TLP header.

A3: The camera 1 sends the TLP to the switch 1.

A4: After receiving the TLP, the switch 1 detects the TLP header, parses the Fmt field, and if the state value of the Fmt field is a state value used in the PCI Express Base Specification Revision 5.0 Version 1.0, processes the TLP based on an original PCIe mechanism, that is, sends the TLP to a root, and then the root determines a receive node by accessing configuration space of each endpoint and sends the TLP to the receive node. If the Fmt field is content defined in this embodiment of this disclosure, routing information in the switch 1 is searched for based on the identity information of the display in the TLP, and the TLP is forwarded to the switch 2 based on a corresponding routing path.

A5: After receiving the data, the switch 2 detects the TLP header, parses the Fmt field, and if the state value of the Fmt field is a state value used in the PCI Express Base Specification Revision 5.0 Version 1.0, processes the TLP based on the original PCIe mechanism, that is, sends the TLP to the root, and then the root determines a receive node by accessing the configuration space of each endpoint and sends the TLP to the receive node. If the Fmt field is content defined in this embodiment of this disclosure, routing information in the switch 2 is searched for based on the identity information of the display 3 in the TLP, and the TLP is forwarded to the display 3 based on a corresponding routing path.

A6: After receiving the TLP, the display 3 parses the TLP header to obtain a type and a format of the image, restores a complete image based on the segment indication information, and transmits the data to the display 3 for display.

Corresponding to manner 1 in step A2, the display 3 may obtain the type and the format of the image in the following manner. The display 3 parses the Fmt field and the type field of the TLP header, determines, based on the 8-bit state value (for example, 10100000), that the data type is the image, and determines the image data type of the image data, the pixel quantization depth of the image data, the resolution of the image data, and the segment indication information of the image data.

Corresponding to manner 2 in step A2, the display 3 may obtain the type and the format of the image in the following manner. The display 3 parses the Fmt field and the type field of the TLP header, determines, based on the 8-bit state value (for example, 10100100), that the data type is the image, determines the image data type of the image data, parses byte 4 to byte 15 of the TLP header, and determines the pixel quantization depth of the image data, the resolution of the image data, and the segment indication information of the image data.

Corresponding to manner 3 in step A2, the display 3 may obtain the type and the format of the image in the following manner. The display 3 parses the Fmt field and the type field of the TLP header, determines, based on the 8-bit state value (for example, 10101001), that the data type is the image, parses byte 4 to byte 15 of the TLP header, and determines the image data type of the image data, the pixel quantization depth of the image data, the resolution of the image data, and the segment indication information of the image data.

Corresponding to manner 4 in step A2, the display 3 may obtain the type and the format of the image in the following manner. The display 3 parses the Fmt field of the TLP header, determines, based on the state value of the Fmt field, that the data type is the image, parses the type field of the TLP header, and determines the image data type of the image data, the pixel quantization depth of the image data, the resolution of the image data, and the segment indication information of the image data based on the state value of the type field.

Corresponding to manner 5 in step A2, the display 3 may obtain the type and the format of the image in the following manner. The display 3 parses the Fmt field of the TLP header, determines, based on the state value of the Fmt field, that the data type is the image, parses the type field of the TLP header, determines the image data type of the image data based on the state value of the type field, parses byte 4 to byte 15 of the TLP header, and determines the pixel quantization depth of the image data, the resolution of the image data, and the segment indication information of the image data.

Corresponding to manner 6 in step A2, the display 3 may obtain the type and the format of the image in the following manner. The display 3 parses the Fmt field of the TLP header, determines, based on the state value of the Fmt field, that the data type is the image, parses byte 4 to byte 15 of the TLP header, and determines the image data type of the image data, the pixel quantization depth of the image data, the resolution of the image data, and the segment indication information of the image data.

Alternatively, the display 3 parses the type field of the TLP header, determines, based on the state value of the type field, that the data type is the image, parses byte 4 to byte 15 of the TLP header, and determines the image data type of the image data, the pixel quantization depth of the image data, the resolution of the image data, and the segment indication information of the image data.

In this embodiment of this disclosure, the Fmt field and the type field are used to indicate information required for transmitting the data, such as the data type and the encapsulation information corresponding to the data type, so that endpoints can communicate with each other even if the root is not used, thereby reducing complexity of an intra-vehicle network.

In addition, the reserved values of the Fmt field and the type field are used, so that the PCIe system can be compatible with an original data transmission method of the PCIe and the data transmission method provided in embodiments of this disclosure.

Figure 17:
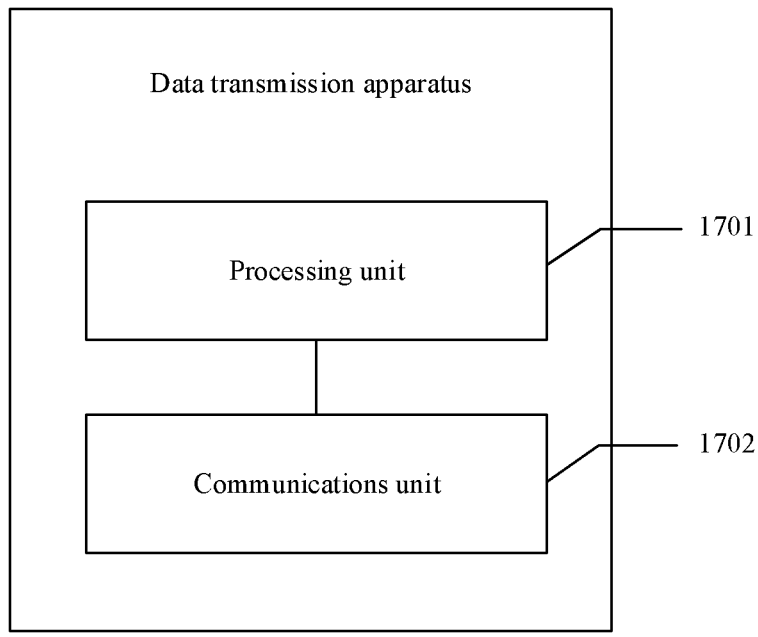
FIG. 17 is a schematic diagram of a structure of a data transmission apparatus according to an embodiment.

Based on the same technical concept as the method embodiments, an embodiment of this disclosure provides a data transmission apparatus. A structure of the apparatus may be shown in FIG. 17, and include a processing unit 1701 and a communications unit 1702.

In an implementation, the data transmission apparatus may be configured to implement the method performed by the first node in embodiments in FIG. 5 to FIG. 16. The apparatus may be the first node, or a chip, a chipset, or a part of a chip in the first node, and the part of the chip is configured to perform a related method function. The processing unit 1701 is configured to encapsulate data into a TLP, where the TLP includes a packet header part, a first field and a second field of the packet header part are used to indicate first encapsulation information, and the first encapsulation information includes a data type of the data and at least one encapsulation parameter corresponding to the data type. The communications unit 1702 is configured to send the TLP to a second node.

In an example description, a value of a bit set indicates the first encapsulation information, and the bit set includes a bit in the first field and a bit in the second field.

In another example description, the first field indicates the data type, and the second field indicates the at least one encapsulation parameter.

The first field may be a type field, and the second field may be a Fmt field, or the first field may be a Fmt field, and the second field may be a type field.

In an implementation, a third field of the packet header part carries second encapsulation information, and the second encapsulation information includes another encapsulation parameter, rather than the encapsulation parameter included in the first encapsulation information, of encapsulation parameters corresponding to the data type.

The third field may be byte 4 to byte 15 or byte 4 to byte 11 of the packet header part.

The data type may include but is not limited to at least one of the following: an image, audio, control information, SWRITE, and security.

The first field is a reserved value. Alternatively, the second field is a reserved value. Alternatively, both the first field and the second field are reserved values.

In another implementation, the data transmission apparatus may further be configured to implement the method performed by the third node in embodiments in FIG. 5 to FIG. 16. The apparatus may be the third node, or a chip, a chip set, or a part of a chip in the third node, and the part of the chip is configured to perform a related method function. The communications unit 1702 is configured to receive a TLP sent by a second node, where a first field and a second field of a packet header part of the TLP are used to indicate first encapsulation information, and the first encapsulation information includes a data type of data carried in the TLP and at least one encapsulation parameter corresponding to the data type. The processing unit 1701 is configured to obtain the data based on the first encapsulation information.

In an example description, a value of a bit set indicates the first encapsulation information, and the bit set includes a bit in the first field and a bit in the second field.

In another example description, the first field indicates the data type, and the second field indicates the at least one encapsulation parameter.

The first field may be a type field, and the second field may be a Fmt field, or the first field may be a Fmt field, and the second field may be a type field.

The data type may include but is not limited to at least one of the following: an image, audio, control information, SWRITE, and security.

The first field is a reserved value. Alternatively, the second field is a reserved value. Alternatively, both the first field and the second field are reserved values.

In a possible implementation, when obtaining the data based on the first encapsulation information, the processing unit 1701 may be further configured to determine a format of the data based on the first encapsulation information, and obtain the data based on the format.

In an implementation, a third field of the packet header part carries second encapsulation information, and the second encapsulation information includes another encapsulation parameter, rather than the encapsulation parameter included in the first encapsulation information, of encapsulation parameters corresponding to the data type.

The third field may be byte 4 to byte 15 or byte 4 to byte 11 of the packet header part.

In a possible implementation, when obtaining, from the TLP, the data based on the first encapsulation information, the processing unit 1701 may alternatively be further configured to determine a format of the data based on the first encapsulation information and the second encapsulation information, and obtain the data based on the format.

Figure 18:
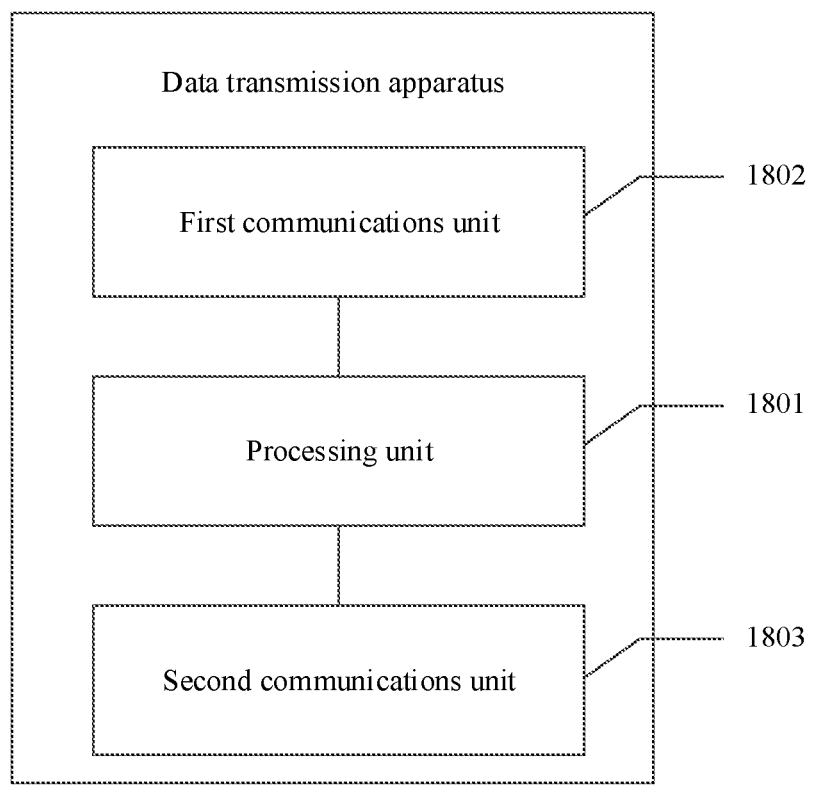
FIG. 18 is a schematic diagram of a structure of another data transmission apparatus according to an embodiment.

An embodiment of this disclosure further provides a data transmission apparatus. A structure of the apparatus may be shown in FIG. 18, and includes a processing unit 1801, a first communications unit 1802, and a second communications unit 1803. In an implementation, the data transmission apparatus may further be configured to implement the method performed by the second node in embodiments in FIG. 5 to FIG. 16. The apparatus may be the second node, or a chip, a chipset, or a part of a chip in the second node, and the part of the chip is configured to perform a related method function. The first communications unit 1802 is configured to transmit data with a first node. The second communications unit 1803 is configured to transmit data with a third node. The processing unit 1801 is configured to receive, by using the first communications unit 1802, a first TLP sent by the first node, and send a second TLP to the third node by using the second communications unit 1803. A first field and a second field of a packet header part of the TLP are used to indicate first encapsulation information, the first encapsulation information includes a data type of data carried in the TLP and at least one encapsulation parameter corresponding to the data type, and the TLP includes the first TLP and/or the second TLP.

In an example description, a value of a bit set indicates the first encapsulation information, and the bit set includes a bit in the first field and a bit in the second field.

In another example description, the first field indicates the data type, and the second field indicates the at least one encapsulation parameter.

The first field may be a type field, and the second field may be a Fmt field, or the first field may be a Fmt field, and the second field may be a type field.

In an implementation, a third field of the packet header part carries second encapsulation information, and the second encapsulation information includes another encapsulation parameter, rather than the encapsulation parameter included in the first encapsulation information, of encapsulation parameters corresponding to the data type.

The third field may be byte 4 to byte 15 or byte 4 to byte 11 of the packet header part.

The data type may include but is not limited to at least one of the following: an image, audio, control information, SWRITE, and security.

The first field is a reserved value. Alternatively, the second field is a reserved value. Alternatively, both the first field and the second field are reserved values.

In an implementation, the first TLP may further carry identity information of the third node.

The processing unit 1801 may be further configured to, before sending the second TLP to the third node by using the second communications unit 1803, determine a routing path based on the identity information of the third node. When sending the second TLP to the third node by using the second communications unit 1803, the processing unit 1801 is further configured to send the second TLP to the third node according to the routing path.

In embodiments of this disclosure, division into modules is an example, and is merely logical function division. In an actual implementation, there may be another division manner. In addition, functional modules in embodiments of this disclosure may be integrated into one processor, or each of the modules may exist alone physically, or two or more modules may be integrated into one module. The integrated module may be implemented in a form of hardware, or may be implemented in a form of a software functional module. It may be understood that, for functions or implementations of the modules in embodiments of this disclosure, further refer to related descriptions in the method embodiments.

Figure 19:
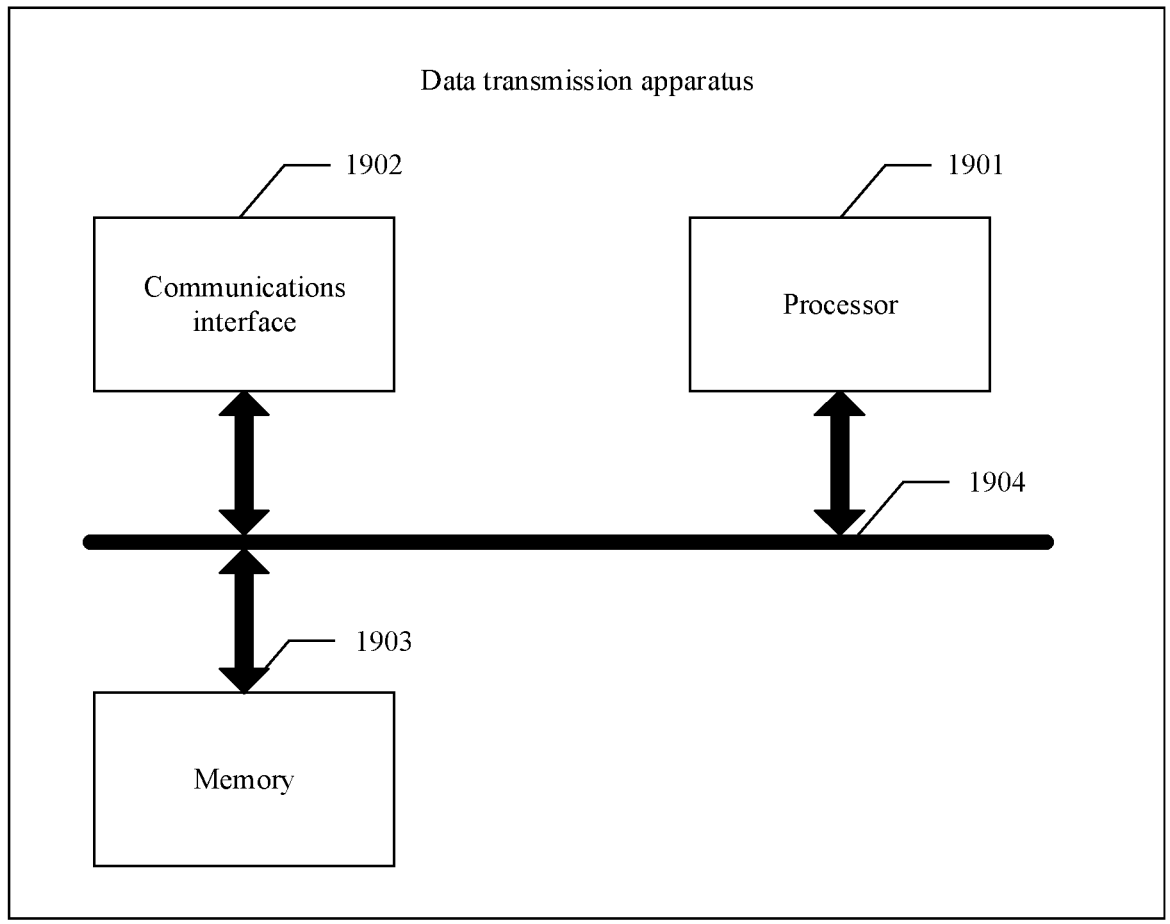
FIG. 19 is a schematic diagram of a structure of another data transmission apparatus according to an embodiment.

In a possible manner, the data transmission apparatus may be shown in FIG. 19, and the apparatus may be an endpoint or a chip in an endpoint. The apparatus may include a processor 1901, and may further include a communications interface 1902, and a memory 1903. The processing unit 1701 may be the processor 1901. The communications unit 1702 may be the communications interface 1902.

The processor 1901 may be a CPU, a digital processing unit, or the like. The communications interface 1902 may be a transceiver, an interface circuit such as a transceiver circuit, a transceiver chip, or the like. The apparatus further includes a memory 1903 configured to store a program executed by the processor 1901. The memory 1903 may be a nonvolatile memory, for example, a hard disk drive (HDD) or a solid-state drive (SSD), or may be a volatile memory, for example, a RAM. The memory 1903 is any other medium that can be used to carry or store expected program code in a form of an instruction or a data structure and that can be accessed by a computer, but is not limited thereto.

The processor 1901 is configured to execute the program code stored in the memory 1903, and is further configured to perform an action of the processing unit 1701. Details are not described herein again in this disclosure. The communications interface 1902 is further used to perform an action of the communications unit 1702. Details are not described herein again in this disclosure.

In this embodiment of this disclosure, a specific connection medium between the communications interface 1902, the processor 1901, and the memory 1903 is not limited. In this embodiment of this disclosure, the memory 1903, the processor 1901, and the communications interface 1902 are connected through a bus 1904 in FIG. 19, and the bus is represented by a thick line in FIG. 19. A connection manner between other components is only schematically described, and is not limited thereto. The bus may be classified into an address bus, a data bus, a control bus, and the like. For ease of representation, only one thick line is used to represent the bus in FIG. 19, but this does not mean that there is only one bus or only one type of bus.

Figure 20:
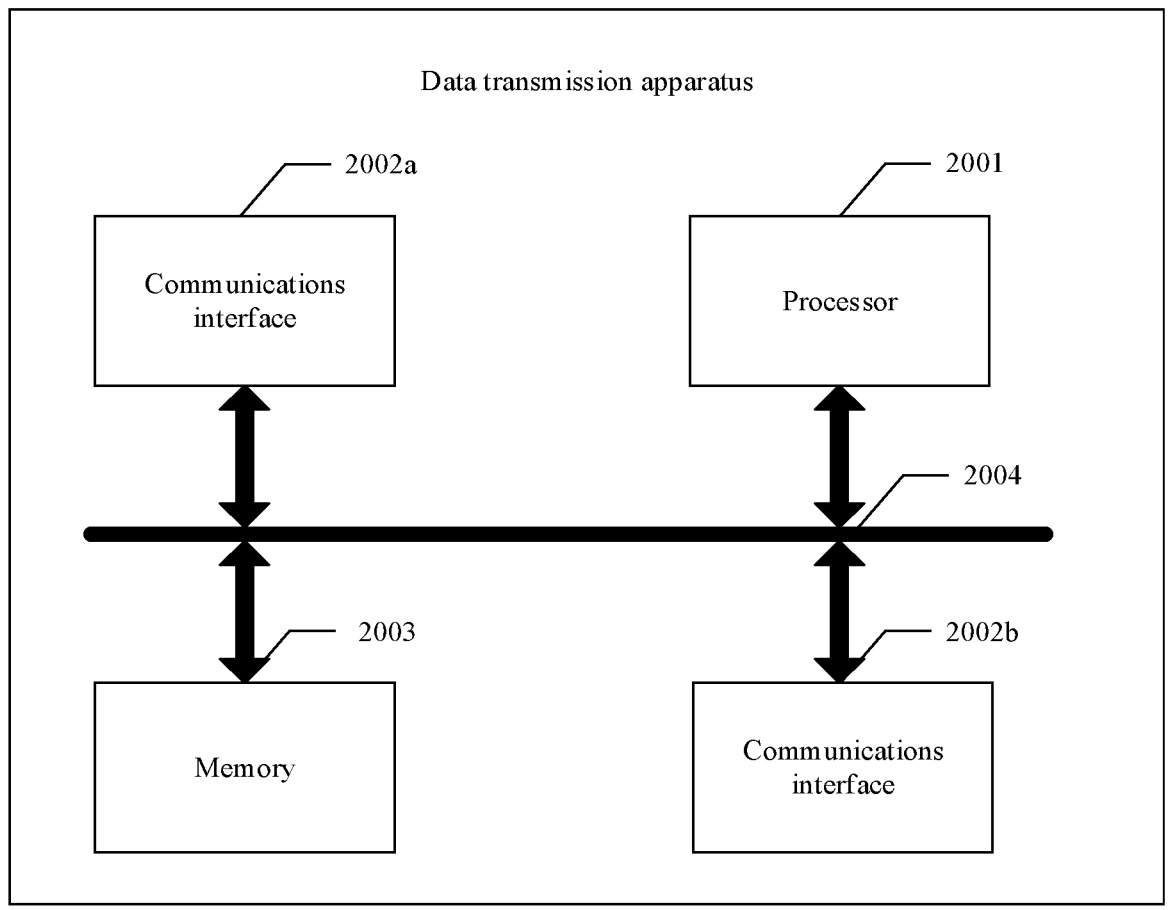
FIG. 20 is a schematic diagram of a structure of another data transmission apparatus according to an embodiment.

In a possible manner, the data transmission apparatus may be shown in FIG. 20, and the apparatus may be a switch or a chip in the switch. The apparatus may include a processor 2001, a communications interface 2002*a*, a communications interface 2002*b*, and a memory 2003. The processing unit 1801 may be the processor 2001. The first communications unit 1802 may be the communications interface 2002*a*. The second communications unit 1803 may be the communications interface 2002*b*.

The processor 2001 may be a CPU, a digital processing unit, or the like. The communications interface 2002*a* and the communications interface 2002*b* each may be a transceiver, an interface circuit such as a transceiver circuit, a transceiver chip, or the like. The apparatus further includes a memory 2003 configured to store a program executed by the processor 2001. The memory 2003 may be a nonvolatile memory such as an HDD or an SSD, or may be a volatile memory such as a RAM. The memory 2003 is any other medium that can be used to carry or store expected program code in a form of an instruction or a data structure and that can be accessed by a computer, but is not limited thereto.

The processor 2001 is configured to execute the program code stored in the memory 2003, and is further configured to perform an action of the processing unit 1801. Details are not described herein again in this disclosure. The communications interface 2002*a* is further used to perform an action of the first communications unit 1802. Details are not described herein again in this disclosure. The communications interface 2002*b* is further used to perform an action of the second communications unit 1803. Details are not described herein again in this disclosure.

In this embodiment of this disclosure, a specific connection medium between the communications interface 2002*a*, the communications interface 2002*b*, the processor 2001, and the memory 2003 is not limited. In this embodiment of this disclosure, the memory 2003, the processor 2001, and the communications interface 2002*a*, the communications interface 2002*b* are connected through a bus 2004 in FIG. 20, and the bus is represented by a thick line in FIG. 20. A connection manner between other components is schematically described, and is not limited thereto. The bus may be classified into an address bus, a data bus, a control bus, and the like. For ease of representation, only one thick line is used to represent the bus in FIG. 20, but this does not mean that there is only one bus or only one type of bus.

An embodiment of the present application further provides a computer-readable storage medium used to store computer software instructions that need to be executed by the processor. The computer software instructions include a program that needs to be executed by the processor.

A person skilled in the art should understand that embodiments of this disclosure may be provided as a method, a system, or a computer program product. Therefore, this disclosure may use a form of a hardware-only embodiment, a software-only embodiment, or an embodiment with a combination of software and hardware. Moreover, this disclosure may use a form of a computer program product that is implemented on one or more computer-usable storage media (including but not limited to a disk memory, a compact disc (CD) ROM (CD-ROM), an optical memory, and the like) that include computer-usable program code.

This disclosure is described with reference to the flowcharts and/or block diagrams of the method, the device (system), and the computer program product according to this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the other programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the other programmable device, to generate computer-implemented processing. Therefore, the instructions executed on the computer or the other programmable device provide steps for implementing a specific function in one or more processes in the flowcharts and/or in one or more blocks in the block diagrams.

Certainly, a person skilled in the art can make various modifications and variations to this disclosure without departing from the protection scope of this disclosure. In this way, this disclosure is intended to cover these modifications and variations of this disclosure provided that they fall within the scope of the claims of this disclosure and their equivalent technologies.

What is claimed is:

1. A Peripheral Component Interconnect Express (PCIe)-based data transmission method implemented by a first node, the method comprising:
   encapsulating data into a transaction layer packet (TLP) comprising a header, wherein the header comprises a first field and a second field that indicate first encapsulation information, wherein the first field comprises a first reserved value, wherein the first encapsulation information comprises a data type of the data and at least one first encapsulation parameter corresponding to the data type, and wherein the first field is a type field and the second field is a format (Fmt) field or the first field is the Fmt field and the second field is the type field;
   indicating the first encapsulation information by:
      a reserved value of the Fmt field and a plurality of state values of the type field;
      a plurality of state values of the Fmt and a reserved value of the type field; or
      the reserved value of the Fmt field and the reserved value of the type field; and
   sending the TLP to a second node.

2. The PCIe-based data transmission method of claim 1, wherein the first encapsulation information is indicated by a value of a bit set, and wherein the bit set comprises all bits in the first field and all bits in the second field.

3. The PCIe-based data transmission method of claim 1, wherein the first field indicates the data type, and wherein the second field indicates the at least one first encapsulation parameter.

4. The PCIe-based data transmission method of claim 1, wherein the header further comprises a third field carrying second encapsulation information, wherein the second encapsulation information comprises a second encapsulation parameter of third encapsulation parameters corresponding to the data type, and wherein the at least one first encapsulation parameter is different from the second encapsulation parameter.

5. The PCIe-based data transmission method of claim 4, wherein the third field is within a range from a byte 4 to a byte 11 of the header.

6. The PCIe-based data transmission method of claim 1, wherein the data type comprises at least one of an image, an audio, control information, stream write (SWRITE).

7. The PCIe-based data transmission method of claim 1, wherein the second field comprises a second reserved value.

8. A Peripheral Component Interconnect Express (PCIe)-based data transmission apparatus comprising:
   a processor configured to encapsulate data into a transaction layer packet (TLP) comprising a header, wherein the header comprises a first field and a second field that indicate first encapsulation information, wherein the first field comprises a first reserved value, wherein the first encapsulation information comprises:
      a data type of the data and at least one first encapsulation parameter corresponding to the data type, and wherein the first field is a type field and the second field is a format (Fmt) field or the first field is the Fmt field and the second field is the type field; and
      a representation of the first encapsulation comprising:
         a reserved value of the Fmt field and a plurality of state values of the type field;
         a plurality of state values of the Fmt and a reserved value of the type field; or
         the reserved value of the Fmt field and the reserved value of the type field; and
   a communications interface configured to send the TLP to a second node, the TLP.

9. The PCIe-based data transmission apparatus of claim 8, wherein the first encapsulation information is indicated by a value of a bit set, and wherein the bit set comprises all bits in the first field and all bits in the second field.

10. The PCIe-based data transmission apparatus of claim 8, wherein the first field indicates the data type, and wherein the second field indicates the at least one first encapsulation parameter.

11. The PCIe-based data transmission apparatus of claim 8, wherein the header further comprises a third field carrying second encapsulation information, wherein the second encapsulation information comprises a second encapsulation parameter of third encapsulation parameters corresponding to the data type, and wherein the at least one first encapsulation parameter is different from the second encapsulation parameter.

12. A Peripheral Component Interconnect Express (PCIe)-based data transmission apparatus comprising:
   a first communications interface configured to communicate with a first node;
   a second communications interface configured to communicate with a third node; and
   a processor coupled to the first communications interface and the second communications interface and configured to:
      receive, from the first node using the first communications interface, a first transaction layer packet (TLP); and
      send a second TLP to the third node using the second communications interface, wherein the first TLP or the second TLP comprises a header, wherein the header comprises a first field and a second field that indicate first encapsulation information, wherein the first field comprises a first reserved value, wherein the first encapsulation information comprises a data type of data carried in the first TLP or the second TLP and at least one first encapsulation parameter corresponding to the data type, wherein the first field is a type field and the second field is a format (Fmt) field or the first field is the Fmt field and the second field is the type field; and
      wherein a reserved value of the Fmt field and all state values of the type field are used to indicate the first encapsulation information, all state values of the Fmt and a reserved value of the type field are used to indicate the first encapsulation information, or the reserved value of the Fmt field and the reserved value of the type field are used to indicate the first encapsulation information.

13. The PCIe-based data transmission apparatus of claim 12, wherein the first encapsulation information is indicated by a value of a bit set, and wherein the bit set comprises all bits in the first field and all bits in the second field.

14. The PCIe-based data transmission apparatus of claim 12, wherein the first field indicates the data type, and wherein the second field indicates the at least one first encapsulation parameter.

15. The PCIe-based data transmission apparatus of claim 12, wherein the header comprises a third field carrying second encapsulation information, wherein the second encapsulation information comprises a second encapsulation parameter of third encapsulation parameters corresponding to the data type, and wherein the at least one first encapsulation parameter is different from the second encapsulation parameter.

16. The PCIe-based data transmission apparatus of claim 12, wherein the data type comprises at least one of an image, an audio, control information, stream write (SWRITE).

17. The PCIe-based data transmission apparatus of claim 12, wherein the first TLP carries identity information of the third node, and wherein the processor is further configured to:
   determine, based on the identity information, a routing path before sending the second TLP to the third node; and
   further send the second TLP to the third node according to the routing path.

18. The PCIe-based data transmission apparatus of claim 15, wherein the third field is within a range from a byte 4 to a byte 11 of the header.

19. The PCIe-based data transmission apparatus of claim 11, wherein the third field is within a range from a byte 4 to a byte 11 of the header.

20. The PCIe-based data transmission apparatus of claim 11, wherein the data type comprises at least one of an image, an audio, control information, stream write (SWRITE).

* * * * *